(12) United States Patent
Kaneko et al.

(10) Patent No.: US 8,489,850 B2
(45) Date of Patent: Jul. 16, 2013

(54) MEMORY APPARATUS AND MEMORY CONTROL METHOD

(75) Inventors: Nobuhiro Kaneko, Kanagawa (JP); Kenichi Nakanishi, Tokyo (JP)

(73) Assignee: Sony Corporation, Tokyo (JP)

( * ) Notice: Subject to any disclaimer, the term of this patent is extended or adjusted under 35 U.S.C. 154(b) by 901 days.

(21) Appl. No.: 11/565,279

(22) Filed: Nov. 30, 2006

(65) Prior Publication Data

US 2007/0150693 A1   Jun. 28, 2007

(30) Foreign Application Priority Data

Dec. 1, 2005   (JP) ................................ P2005-348111

(51) Int. Cl.
*G06F 12/08* (2006.01)

(52) U.S. Cl.
USPC .................................. 711/202; 711/E12.017

(58) Field of Classification Search
None
See application file for complete search history.

(56) References Cited

U.S. PATENT DOCUMENTS

| | | | | |
|---|---|---|---|---|
| 5,263,142 | A * | 11/1993 | Watkins et al. | 710/22 |
| 2005/0195635 | A1 * | 9/2005 | Conley et al. | 365/149 |
| 2007/0016719 | A1 * | 1/2007 | Ono et al. | 711/103 |
| 2007/0079064 | A1 * | 4/2007 | Kobayashi et al. | 711/113 |

FOREIGN PATENT DOCUMENTS

| | | |
|---|---|---|
| JP | 09-097206 | 4/1997 |
| JP | 11-73363 | 3/1999 |
| JP | 11-126488 | 5/1999 |
| JP | 11-249968 | 9/1999 |
| JP | 2002-091707 | 3/2002 |
| JP | 2003-015928 | 1/2003 |
| JP | 2003-316659 | 11/2003 |
| JP | 2005-174468 | 6/2005 |
| JP | 2005-225716 | 8/2005 |
| WO | 02/054247 | 7/2002 |

OTHER PUBLICATIONS

Japanese Office Action issued on Apr. 21, 2009, for corresponding JP Patent Application No. 2005-348111.

* cited by examiner

*Primary Examiner* — Edward Dudek, Jr.
*Assistant Examiner* — Ryan Dare
(74) *Attorney, Agent, or Firm* — K&L Gates LLP

(57) ABSTRACT

A memory control method is disclosed which includes: a storing step of storing a logical to physical conversion table retaining relations of correspondence between addresses of logical blocks in a user data area on the one hand, and addresses of physical blocks assigned to the logical blocks on the other hand, along with addresses of physical blocks in a cache area, the physical block addresses corresponding to the physical block addresses in the logical to physical conversion table; a first writing step of writing, to a deleted new cache block in the cache area, data in excess of a designated logical boundary which defines a logical space size in units of a plurality of sectors within a user data block of the user data area; and a second writing step of writing the data starting from the beginning of the new cache block upon data write in the first writing step to the new cache block, regardless of the logical address space of the new cache block.

26 Claims, 20 Drawing Sheets

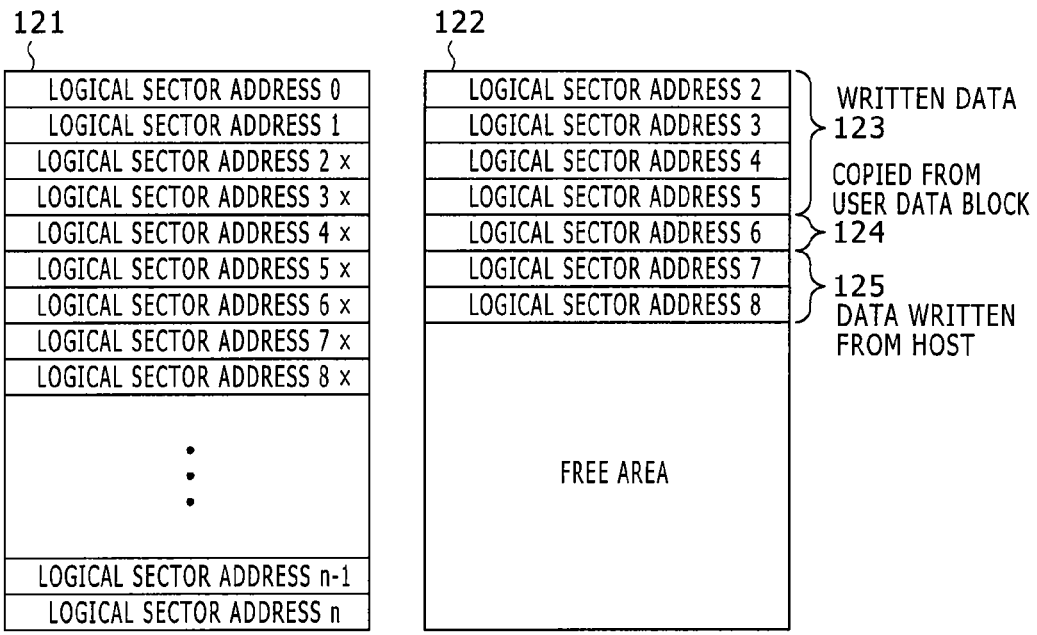
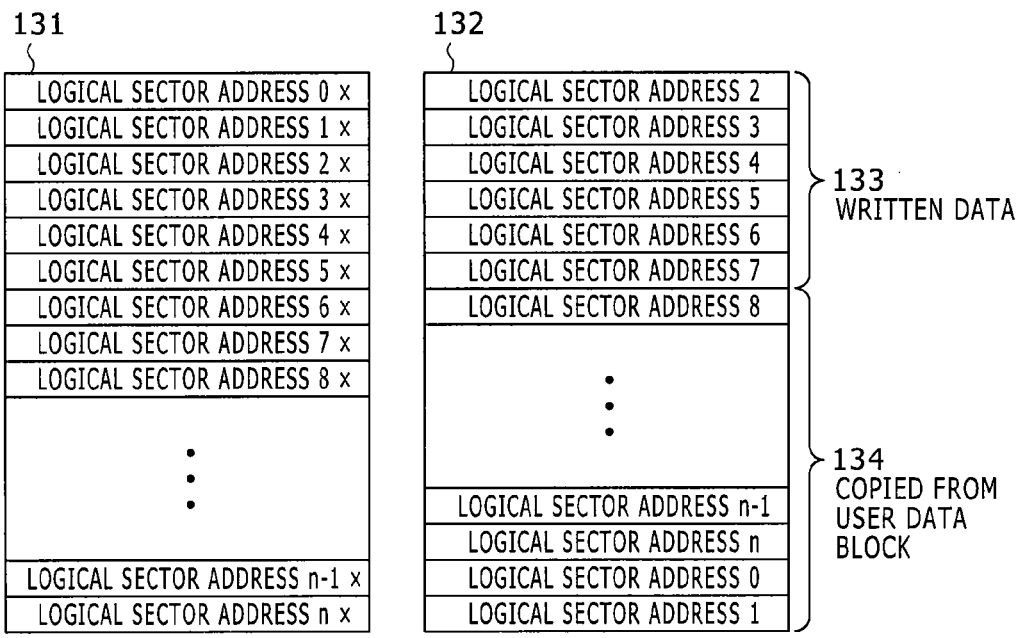

| |
|---|
| LOGICAL SECTOR ADDRESS 0 x |
| LOGICAL SECTOR ADDRESS 1 x |
| LOGICAL SECTOR ADDRESS 2 x |
| LOGICAL SECTOR ADDRESS 3 x |
| LOGICAL SECTOR ADDRESS 4 x |
| LOGICAL SECTOR ADDRESS 5 x |
| LOGICAL SECTOR ADDRESS 6 x |
| LOGICAL SECTOR ADDRESS 7 x |
| LOGICAL SECTOR ADDRESS 8 x |
| ⋮ |
| LOGICAL SECTOR ADDRESS n-1 x |
| LOGICAL SECTOR ADDRESS n x |

142

| |
|---|
| LOGICAL SECTOR ADDRESS 0 |
| LOGICAL SECTOR ADDRESS 1 |
| LOGICAL SECTOR ADDRESS 2 |
| LOGICAL SECTOR ADDRESS 3 |
| LOGICAL SECTOR ADDRESS 4 |
| LOGICAL SECTOR ADDRESS 5 |
| LOGICAL SECTOR ADDRESS 6 |
| LOGICAL SECTOR ADDRESS 7 |
| LOGICAL SECTOR ADDRESS 8 |
| ⋮ |
| LOGICAL SECTOR ADDRESS n-1 |
| LOGICAL SECTOR ADDRESS n |

143 WRITTEN DATA

144 DATA WRITTEN FROM HOST

145

| |
|---|
| LOGICAL SECTOR ADDRESS 0 x |
| LOGICAL SECTOR ADDRESS 1 x |
| LOGICAL SECTOR ADDRESS 2 x |
| LOGICAL SECTOR ADDRESS 3 x |
| LOGICAL SECTOR ADDRESS 4 x |
| LOGICAL SECTOR ADDRESS 5 x |
| LOGICAL SECTOR ADDRESS 6 x |
| LOGICAL SECTOR ADDRESS 7 x |
| LOGICAL SECTOR ADDRESS 8 x |
| ⋮ |
| LOGICAL SECTOR ADDRESS n-1 x |
| LOGICAL SECTOR ADDRESS n x |

146

| |
|---|
| LOGICAL SECTOR ADDRESS 2 |
| LOGICAL SECTOR ADDRESS 3 |
| LOGICAL SECTOR ADDRESS 4 |
| LOGICAL SECTOR ADDRESS 5 |
| LOGICAL SECTOR ADDRESS 6 |
| LOGICAL SECTOR ADDRESS 7 |
| LOGICAL SECTOR ADDRESS 8 |
| ⋮ |
| LOGICAL SECTOR ADDRESS n-1 |
| LOGICAL SECTOR ADDRESS n |
| LOGICAL SECTOR ADDRESS 0 |
| LOGICAL SECTOR ADDRESS 1 |

147 WRITTEN DATA

148 DATA WRITTEN FROM HOST

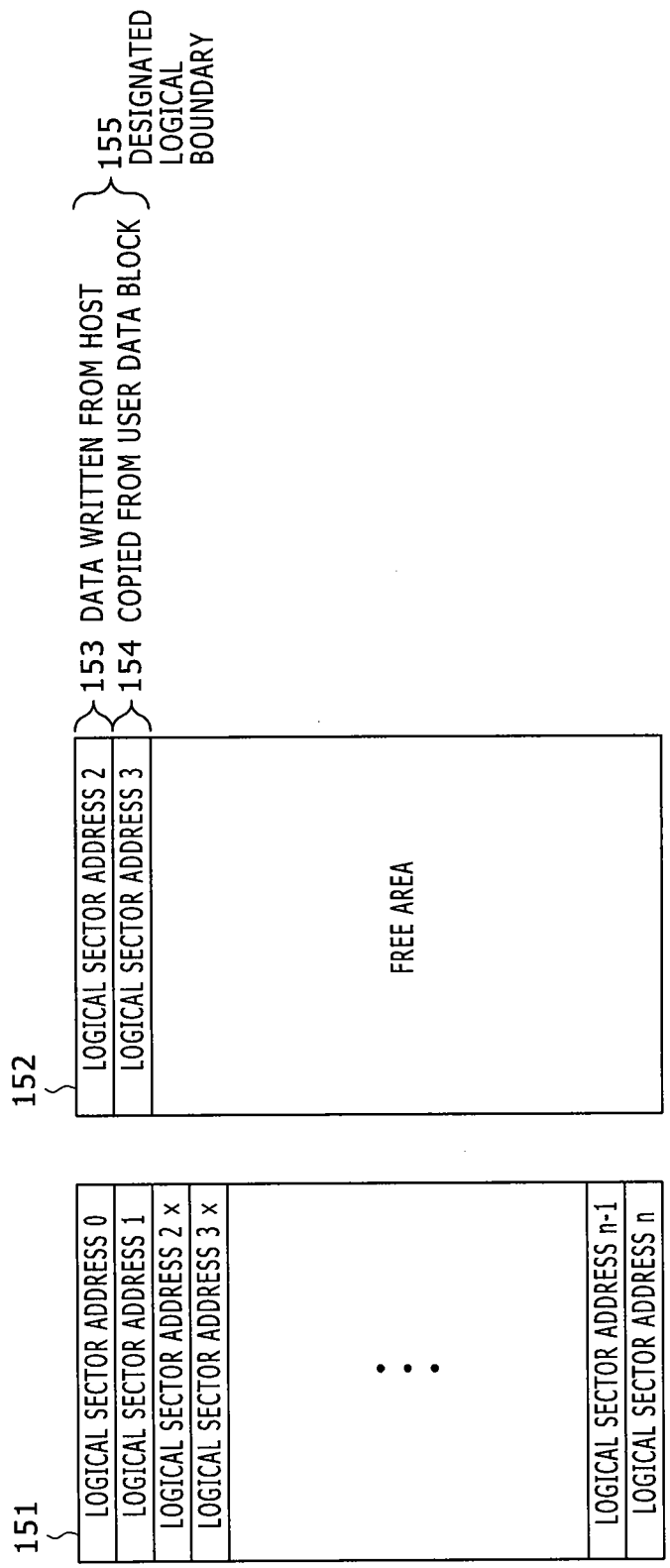

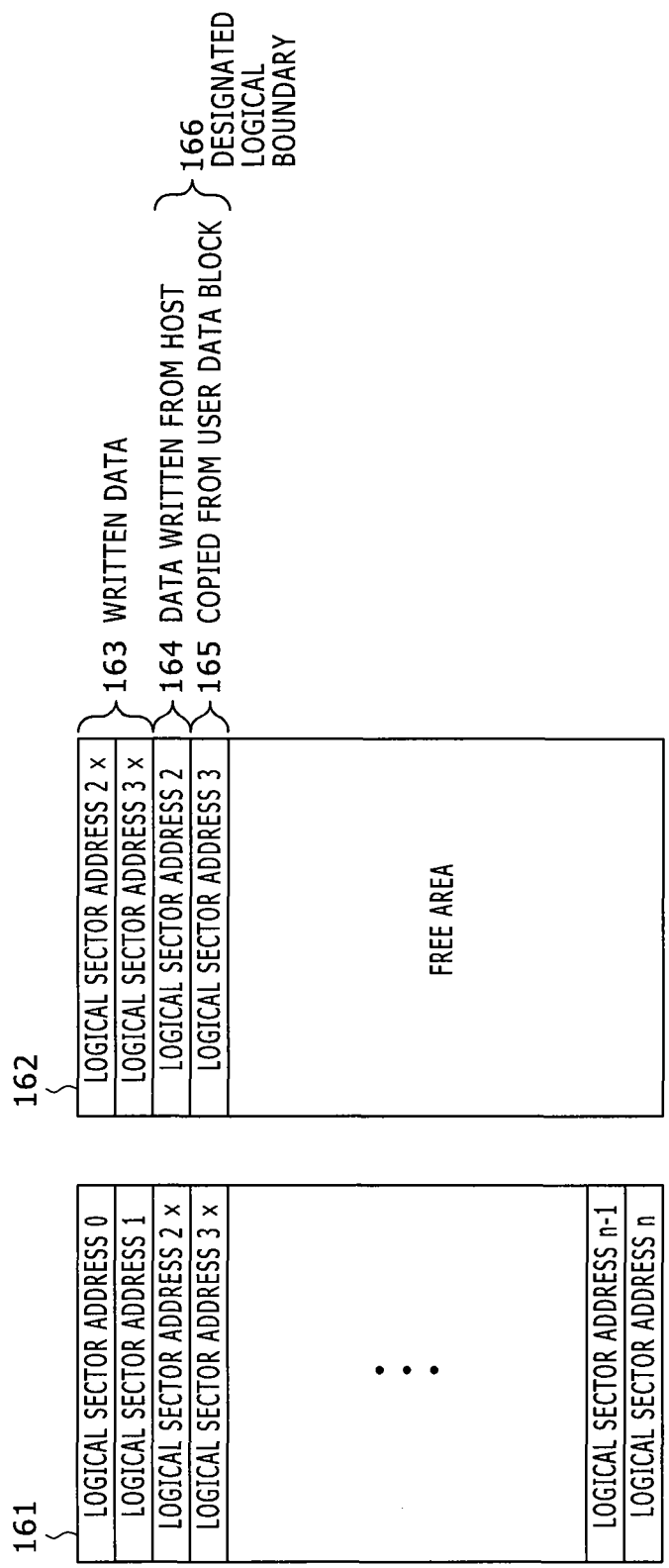

MEMORY APPARATUS AND MEMORY CONTROL METHOD

CROSS REFERENCES TO RELATED APPLICATIONS

The present application claims priority to Japanese Patent Application JP 2005-348111 filed with the Japanese Patent Office on Dec. 1, 2005, the entire contents of which being incorporated herein by reference.

BACKGROUND

The present application relates to a memory apparatus and a memory control method for controlling the memory apparatus that may include a nonvolatile memory used illustratively as a flash memory.

Memory apparatus equipped with a flash memory has existed typically for use as an external storage to such devices as personal computers, digital still cameras, digital video cameras, and audio recorders. Data is usually written to and read from the flash memory in units of clusters on a random basis, whereas data is deleted from the flash memory generally in units of blocks.

In the flash memory, memory elements degrade through repeated data updates and are thus subject to constraints on the number of updates. Measures are taken to prevent repeated access to particular clusters in order to maximize the service life of the flash memory. More specifically, when data having a logical address corresponding to a given physical address is to be updated, the new data will be written not to the same physical block but to a new, unused physical block (free block) instead.

Before and after a data update, the same logical address is assigned to different physical addresses. For this reason, the flash memory is arranged to hold an address conversion table specifying the relations of correspondence between the logical and physical addresses in use. When the memory apparatus is attached to a host apparatus, the address conversion table is retrieved from the flash memory and loaded into a working memory of the host or memory apparatus.

In the typical memory apparatus, an update of data in only a few sectors still leads to the update of an entire physical block. It takes time to accomplish the access involved with the update, which would promote memory element degradation. The update-incurred access is minimized illustratively by dividing each of the blocks in the flash memory into a header area and a data area. A data record to be written to the data area has its start address and its record length written to the header area. Each data record to be written to the data area is supplemented by a link information area and a flag area. Data is thus written and updated in units of data records. When there is no available space left in a given block, effective data records are extracted from the block and transferred to a free block; the initial block from which the transfer was effected is deleted (e.g., see Japanese Patent Laid-Open No. Hei 11-73363).

One disadvantage of the typical flash memory in which each block is divided into the header and data areas is the failure to use the memory effectively. Because each block is furnished with a header area, a link information area and a flag area, the capacity of the memory to accommodate data tends to drop.

One way to bypass the disadvantage above has been proposed by this applicant in the form of a memory apparatus, a memory apparatus control method, and a data processing system disclosed in Japanese Patent Application No. 2005-225716. The inventive arrangements involve establishing a logical to physical conversion table that specifies the correspondence between logical and physical block addresses together with the ending cluster number of each physical block. In operation, a check is made to determine whether the starting cluster number SC of the data to be written based on a write instruction is larger than the ending cluster number EC of a given physical block in the logical to physical conversion table. If the starting cluster number SC is found larger than the ending cluster number EC, the data is added to the physical block with no physical block update carried out as in usual cases (where the new data would be written and the original physical block copied).

The arrangements proposed above help reduce the frequency of flash memory deletion and efficiently update data in the flash memory without significantly reducing its storage capacity. Degradation of the memory elements is thus lowered while the speed of access to data locations is enhanced.

According to the above-cited Patent Application, the memory apparatus furnished with a nonvolatile memory as its recording medium is kept from overwriting the nonvolatile memory with data. Furthermore, the increments in which to write and to delete data differ between these two operations (i.e., data is handled in smaller units when written than when deleted). Data may be added into blocks of the nonvolatile memory.

A memory apparatus using an FAT (file allocation tables) file system usually needs management information updates in the FAT as well as directory entry updates at the same time that file data is written.

A recording apparatus that retains management information has a memory area in which to hold the management information in addition to the data area for use by the user. Every time a host writes file data, the recording apparatus updates the management information in its flash memory.

A memory apparatus having a cache block arrangement holds data in units of clusters in the cache block. The relations of correspondence between logical and physical addresses in the cache block are fixed (i.e., logical addresses are assigned in ascending order starting from the beginning of the physical block).

The above arrangements, because of their constitution, let a write-back take place during a write of file data to continuous logical addresses in excess of a designated logical boundary representative of a logical space size in a plurality of sectors, even if the update size is less than the cluster size. The write-back process entails block deletion, which will result in a shortened service life of the product. Another disadvantage is that the write-back incurs a decrease in write performance due to the garbage collection and deletion involved.

At the time of management information updates in the FAT and directory entry updates in conjunction with file data writes, overwrite operations occur frequently because access is concentrated on particular logical addresses. This is attributable to the fact that the size of the files to be written is short of the designated logical boundary representing the logical space size in units of a plurality of sectors. In the case of the above-mentioned arrangements proposed by this applicant, whenever a write is made to the logical space from which data has been written to a cache block, a write-back takes place. The write-back process entails block deletion leading to a shortened service life of the product. The write-back further incurs a drop in write performance attributable to garbage collection and deletion.

That is, because the nonvolatile memory (NAND type flash memory) cannot be overwritten with data and because data is deleted in units of blocks, the memory apparatus typically needs to keep the logical to physical conversion table consistent in terms of what is contained therein. For this reason, the write-back process entails saving the update data into another block on a block by block basis regardless of the size of the update data. Any data other than the update data in the original block needs to be copied through garbage collection. Since there emerges a block containing unnecessary data following the update, that block needs to be deleted. However, there exist constraints on the number of times blocks can be deleted.

SUMMARY

The present application has been made in view of the above circumstances and provides a memory apparatus and a memory control method for preventing the occurrence of write-back operations entailing garbage collection and deletion, whereby the decrease in write performance is averted.

In carrying out the present application and according to one embodiment thereof, there is provided a memory apparatus having a nonvolatile memory and a control circuit configured to control the nonvolatile memory in operation. In the memory apparatus, the nonvolatile memory includes a management area in which to record management information, a user data area in which to record data coming from a user, and a cache area in which to hold temporarily the data to be written to and read from the user data area. In the nonvolatile memory, the management area includes: a logical to physical conversion table retaining relations of correspondence between addresses of logical blocks in the user data area on the one hand, and addresses of physical blocks assigned to the logical blocks on the other hand; and addresses of physical blocks in the cache area, the physical block addresses corresponding to the physical block addresses in the logical to physical conversion table. In the memory apparatus, the control circuit includes: first writing means for writing, to a deleted new cache block in the cache area, data in excess of a designated logical boundary which defines a logical space size in units of a plurality of sectors within a user data block of the user data area; and second writing means for having the data written starting from the beginning of the new cache block upon data write by the first writing means to the new cache block, regardless of the logical address space of the new cache block.

With the above-outlined structure in use, if a host is to write data in excess of the designated logical boundary defining the logical space size in units of a plurality of sectors, the data is written to a new cache block so that a write-back will not take place. When the write-back is suppressed in this manner, garbage collection is prevented and write performance is improved accordingly. The suppression of write-back operations lowers the frequency of data deletion from the blocks, whereby the service life of the product is prolonged.

According to another embodiment, there is provided a memory apparatus having a nonvolatile memory and a control circuit configured to control the nonvolatile memory in operation. In the memory apparatus, the nonvolatile memory includes a management area in which to record management information, a user data area in which to record data coming from a user, and a cache area in which to hold temporarily the data to be written to and read from the user data area. In the nonvolatile memory, the management area includes: a logical to physical conversion table retaining relations of correspondence between addresses of logical blocks in the user data area on the one hand, and addresses of physical blocks assigned to the logical blocks on the other hand; and addresses of physical blocks in the cache area, the physical block addresses corresponding to the physical block addresses in the logical to physical conversion table. In the memory apparatus, the control circuit includes: sixth writing means for writing, to a deleted new cache block in the cache area, data short of a designated logical boundary which defines a logical space size in units of a plurality of sectors within a user data block of the user data area; and seventh writing means for having data written starting from the beginning of the new cache block upon data write by the sixth writing means to the new cache block, regardless of the logical address space of the new cache block.

Where the above-outlined structure is in use, if the host is to write FAT-destined management information or a directory entry short of the designated logical boundary defining the logical space size in units of a plurality of sectors, the data is written to a new cache block so that a write-back will not take place. With the write-back suppressed, garbage collection is prevented and write performance is improved accordingly. The suppression of write-back operations lowers the frequency of data deletion from the blocks, whereby the service life of the product is prolonged.

According to a further embodiment, there is provided a memory apparatus having a nonvolatile memory and a control circuit configured to control the nonvolatile memory in operation. In the memory apparatus, the nonvolatile memory includes a management area in which to record management information, a user data area in which to record data coming from a user, and a cache area in which to hold temporarily the data to be written to and read from the user data area. In the nonvolatile memory, the management area includes: a logical to physical conversion table retaining relations of correspondence between addresses of logical blocks in the user data area on the one hand, and addresses of physical blocks assigned to the logical blocks on the other hand; and addresses of physical blocks in the cache area, the physical block addresses corresponding to the physical block addresses in the logical to physical conversion table. In the memory apparatus, the control circuit includes: twelfth writing means for, if all cache blocks in the cache area are found fully written upon data write to user data blocks in the user data area, then writing the data from the cache blocks back to the user data blocks without starting garbage collection as a copy operation preparatory to executing the write-back; and first preferential processing means for causing the twelfth writing means to execute the write-back to the cache blocks preferentially in ascending order of data update frequency of the cache blocks.

With the above-outlined structure, if there is no free cache block, a write-back operation is performed on the cache blocks preferentially in ascending order of their data update frequency. The cache blocks of low data update frequency starting from the one whose data update frequency is the lowest are preferentially subjected to write-back operations. This boosts the efficiency of cache block utilization in terms of data writes. That is because the cache blocks with lower levels of data update frequency are less likely to undergo writes than the blocks with higher levels of data update frequency. When the efficiency of cache block utilization is raised in terms of writes, the write-back process tends to be suppressed. This inhibits garbage collection and thereby improves write performance. The suppression of write-back operations lowers the frequency of data deletion from the blocks, whereby the service life of the product is prolonged.

According to an even further embodiment, there is provided a memory apparatus having a nonvolatile memory and a control circuit configured to control the nonvolatile memory in operation. In the memory apparatus, the nonvolatile memory includes a management area in which to record management information, a user data area in which to record data coming from a user, and a cache area in which to hold temporarily the data to be written to and read from the user data area. In the nonvolatile memory, the management area includes: a logical to physical conversion table retaining relations of correspondence between addresses of logical blocks in the user data area on the one hand, and addresses of physical blocks assigned to the logical blocks on the other hand; and addresses of physical blocks in the cache area, the physical block addresses corresponding to the physical block addresses in the logical to physical conversion table. In the memory apparatus, the control circuit includes: thirteenth writing means for, if all cache blocks in the cache area are found fully written upon data write to user data blocks in the user data area, then writing the data to another cache block; and second preferential processing means for, if that another cache block is found fully written upon data write by the thirteenth writing means, then carrying out garbage collection as a copy operation preparatory to executing a write-back operation preferentially on the fully-written cache blocks.

With the above-described structure, where there is no free cache block available for write-back, the written cache blocks are preferentially subjected to garbage collection. The preferential write-back to the written cache blocks raises the efficiency of cache block utilization in terms of data writes because where there is no free cache block, there is no need to use the cache blocks. The improved efficiency of cache block utilization in terms of data writes tends to inhibit garbage collection and thereby boosts write performance. The suppression of write-back operations lowers the frequency of data deletion from the blocks, whereby the service life of the product is prolonged. The absence of free cache blocks eliminates the need for performing a copy operation on the blocks through garbage collection, whereby overall performance is enhanced.

According to a still further embodiment, there is provided a memory control method including: a storing step of storing a logical to physical conversion table retaining relations of correspondence between addresses of logical blocks in a user data area on the one hand, and addresses of physical blocks assigned to the logical blocks on the other hand, along with addresses of physical blocks in a cache area, the physical block addresses corresponding to the physical block addresses in the logical to physical conversion table; a first writing step of writing, to a deleted new cache block in the cache area, data in excess of a designated logical boundary which defines a logical space size in units of a plurality of sectors within a user data block of the user data area; and a second writing step of writing the data starting from the beginning of the new cache block upon data write in the first writing step to the new cache block, regardless of the logical address space of the new cache block.

Where the above-outlined method is in use, if the host is to write data in excess of the designated logical boundary defining the logical space size in units of a plurality of sectors, the data is written to a new cache block so that a write-back will not take place. When the write-back is suppressed in this manner, garbage collection is prevented and write performance is improved accordingly. The suppression of write-back operations lowers the frequency of data deletion from the blocks, whereby the service life of the product is prolonged.

According to yet another embodiment, there is provided a memory control method including: a storing step of storing a logical to physical conversion table retaining relations of correspondence between addresses of logical blocks in a user data area on the one hand, and addresses of physical blocks assigned to the logical blocks on the other hand, along with addresses of physical blocks in a cache area, the physical block addresses corresponding to the physical block addresses in the logical to physical conversion table; a sixth writing step of writing, to a deleted new cache block in the cache area, data short of a designated logical boundary which defines a logical space size in units of a plurality of sectors within a user data block of the user data area; and a seventh writing step of writing the data starting from the beginning of the new cache block upon data write in the sixth writing step to the new cache block, regardless of the logical address space of the new cache block.

With the above-outlined method in use, if the host is to write FAT-destined management information or a directory entry short of the designated logical boundary defining the logical space size in units of a plurality of sectors, the data is written to a new cache block so that a write-back will not take place. With the write-back suppressed, garbage collection is prevented and write performance is improved accordingly. The suppression of write-back operations lowers the frequency of data deletion from the blocks, whereby the service life of the product is prolonged.

According to another embodiment, there is provided a memory control method including: a storing step of storing a logical to physical conversion table retaining relations of correspondence between addresses of logical blocks in a user data area on the one hand, and addresses of physical blocks assigned to the logical blocks on the other hand, along with addresses of physical blocks in a cache area, the physical block addresses corresponding to the physical block addresses in the logical to physical conversion table; a twelfth writing step of, if all cache blocks in the cache area are found fully written upon data write to user data blocks in the user data area, then writing the data from the cache blocks back to the user data blocks without starting garbage collection as a copy operation preparatory to executing the write-back; and a first preferential processing step of causing the twelfth writing step to execute the write-back to the cache blocks preferentially in ascending order of data update frequency of the cache blocks.

With the above-outlined method in use, if there is no free cache block, a write-back operation is performed on the cache blocks preferentially in ascending order of their data update frequency. The cache blocks of low data update frequency starting from the one whose data update frequency is the lowest are preferentially subjected to write-back operations. This boosts the efficiency of cache block utilization in terms of data writes. That is because the cache blocks with lower levels of data update frequency are less likely to undergo writes than the blocks with higher levels of data update frequency. When the efficiency of cache block utilization is raised in terms of writes, the write-back process tends to be suppressed. This inhibits garbage collection and thereby improves write performance. The suppression of write-back operations lowers the frequency of data deletion from the blocks, whereby the service life of the product is prolonged.

According to a further embodiment, there is provided a memory control method including: a storing step of storing a logical to physical conversion table retaining relations of correspondence between addresses of logical blocks in a user data area on the one hand, and addresses of physical blocks assigned to the logical blocks on the other hand, along with addresses of physical blocks in a cache area, the physical block addresses corresponding to the physical block addresses in the logical to physical conversion table; a thirteenth writing step of, if all cache blocks in the cache area are found fully written upon data write to user data blocks in the user data area, then writing the data to another cache block; and a second preferential processing step of, if that another cache block is found fully written upon data write in the thirteenth writing step, then carrying out garbage collection as a copy operation preparatory to executing a write-back operation preferentially on the fully-written cache blocks.

With the above-outlined method in use, where there is no free cache block available for write-back, the written cache blocks are preferentially subjected to garbage collection. The preferential write-back to the written cache blocks raises the efficiency of cache block utilization in terms of data writes because where there is no free cache block, there is no need to use the cache blocks. The improved efficiency of cache block utilization in terms of data writes tends to inhibit garbage collection and thereby boosts write performance. The suppression of write-back operations lowers the frequency of data deletion from the blocks, whereby the service life of the product is prolonged. The absence of free cache blocks eliminates the need for performing a copy operation on the blocks through garbage collection, whereby overall performance is enhanced.

As outlined above, the memory apparatus of the present invention operating under the inventive block control scheme using a cache block arrangement makes the number of times write-back occurs significantly smaller than typical memory apparatuses. The reduced frequency of write-back operations translates into a much smaller number of times copy and deletion take place than before, thereby improving the speed at which to update data. This contributes to prolonging the service life of the memory device.

Additional features and advantages are described herein, and will be apparent from, the following Detailed Description and the figures.

BRIEF DESCRIPTION OF THE FIGURES

FIG. 13 is a schematic view showing status of a cache block and a user data block upon write in step S23.
FIG. 14 is a schematic view showing status of a cache block and a user data block upon write in step S25.
FIG. 15 is a schematic view showing status (two patterns) of a cache block (AD-cache) full of data written from a host.
FIG. 16 is a schematic view showing status of a cache block and a user data block upon write in step S11.
FIG. 17 is a schematic view showing status of a cache block and a user data block upon write in step S33.

DETAILED DESCRIPTION

Preferred embodiments will now be described in detail with reference to the accompanying drawings.

Figure 1:
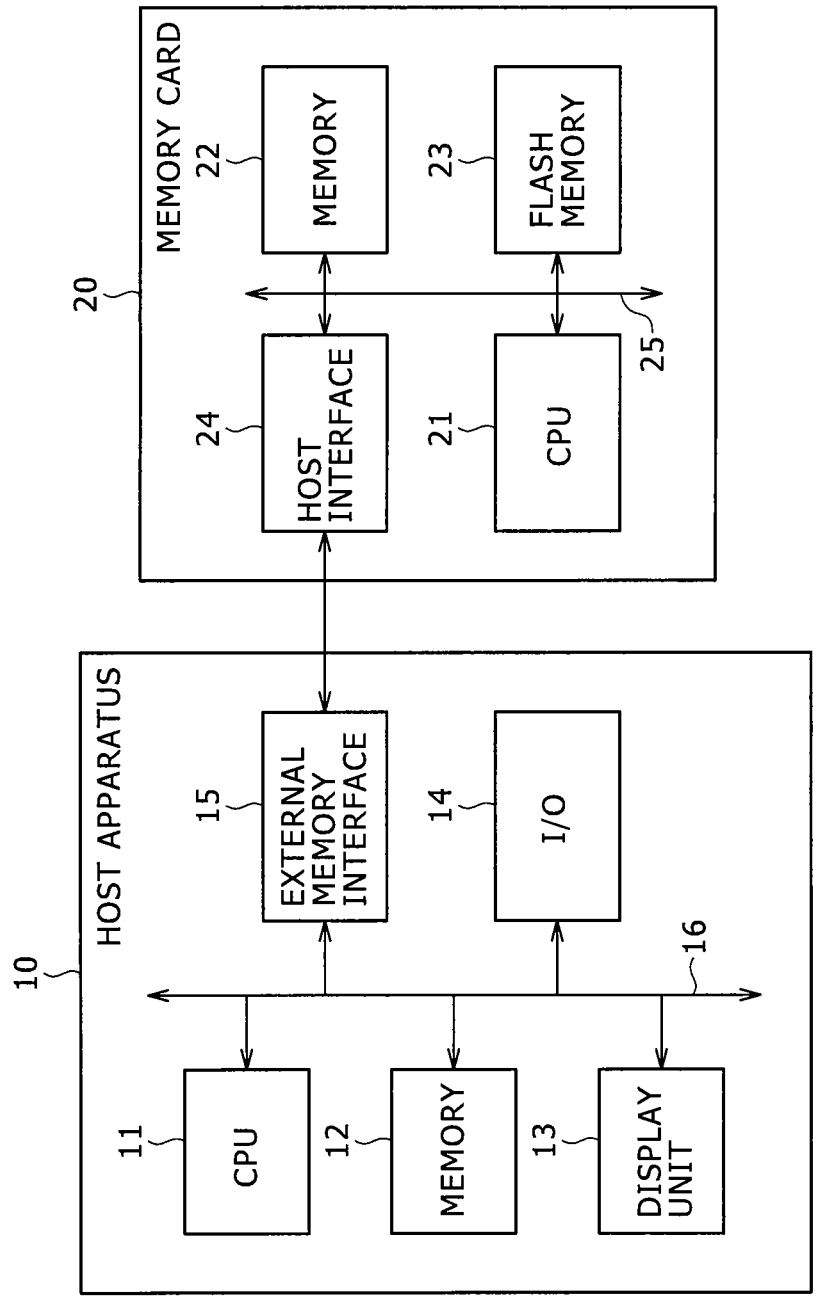
FIG. 1 is a schematic view outlining a structure of a data processing system embodying the present invention.

FIG. 1 is a schematic view outlining a structure of a data processing system embodying the present invention.

As shown in FIG. 1, this data processing system has a memory card 20 containing a flash memory 23 and a host apparatus 10 to which the memory card 20 may be attached in a detachable manner.

The host apparatus 10 may be any one of such pieces of equipment as a personal computer, a digital still camera, a digital video camera, and an audio recorder. The host apparatus 10 is made up of a CPU 11, a memory 12, a display unit 13, an input/output (I/O) section 14, and an external memory interface (I/F) 15. The CPU 11 is connected to the memory 12, display unit 13, input/output section 14, and external memory interface 15 by means of a bus 16. The memory 12 includes a ROM for accommodating programs and a RAM serving as a working memory. The external memory interface 15 exchanges data with the memory card 20 in accordance with control commands from the CPU 11.

The memory card 20 includes a CPU 21, a memory 22, a flash memory 23, and a host interface 24. The CPU 21 is connected to the memory 22, flash memory 23, and host interface 24 via a bus 25. The memory 22 includes a ROM for accommodating programs and a RAM serving as a working memory. The flash memory 23 may illustratively be a NOR-type or NAND-type flash memory (nonvolatile memory). The host interface 24 exchanges data with the host apparatus 10 in keeping with control commands from the CPU 21.

Figure 2:
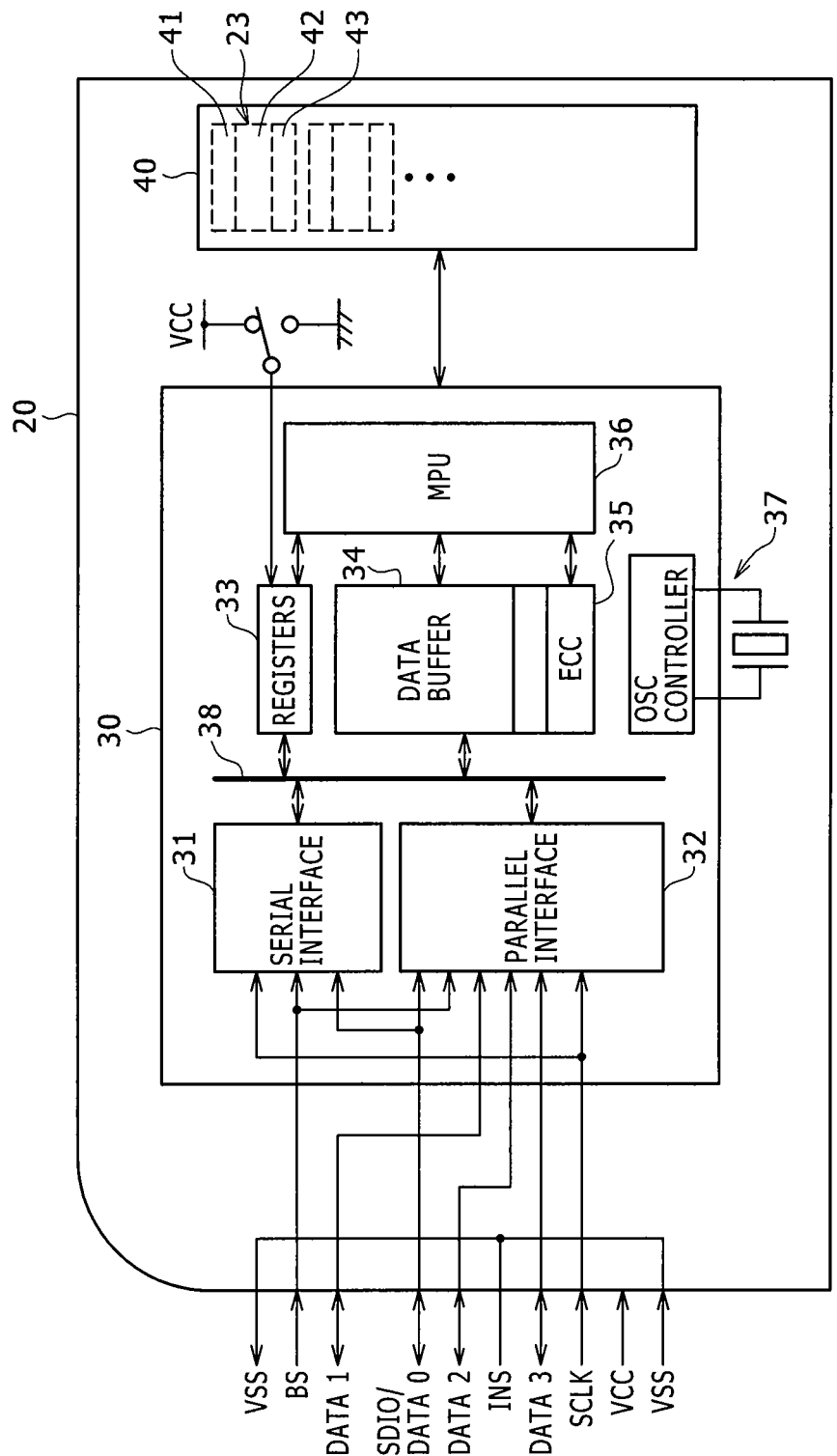
FIG. 2 is a block diagram showing a structure of a memory card included in FIG. 1.

FIG. 2 is a block diagram showing a structure of the memory card 20 included in FIG. 1.

As shown in FIG. 2, the memory card 20 may illustratively be a Memory Stick (registered trademark) which may be attached to the host apparatus 10 and to which data may be written from the host apparatus 10. The memory card 20 has a memory section 40 including a plurality of flash memories 23 and a controller section 30 that controls the memory section 40.

The controller section 30 has a serial interface (I/F) 31, a parallel interface (I/F) 32, registers 33, a data buffer 34, an error-correcting circuit (ECC) 35, an MPU (micro-processing unit) 36, and a clock signal generator 37. The serial interface 31, parallel interface 32, registers 33, data buffer 34, and ECC 35 are interconnected by means of a bus 38. The registers 33, data buffer 34, and ECC 35 are connected to the MPU 36.

The registers 33 include an instruction register and other elements. The data buffer 34 holds temporarily the data to be written to and read from the flash memory 23. The ECC 35 corrects errors that may occur in the data placed into the data buffer 34. The clock signal generator 37 generates a clock signal for use inside the Memory Stick.

The data output by the host apparatus 10 is input to the serial interface 31 or parallel interface 32, or to both before being transferred to the data buffer 34. The data sent to the data buffer 34 is written to the flash memory 23 by the MPU 36.

The memory card 20 is supplied with power through signal lines VSS and VCC. The memory card 20 is further connected to a number of signal lines: a signal line SCLK through which to input a clock signal necessary to admit data from the host apparatus 10; a signal line INS for verifying whether the memory card 20 is properly attached to the host apparatus 10; and a signal line BS for determining the direction of the data supplied from the host apparatus 10.

What follows is an outline of how the data processing system above performs its write operation. A write command, an address to which to write data, and the write data are sent by the host apparatus 10 in that order and received consecutively by the memory card 20. Data is written to and read from the flash memory 23 in units of sectors, while the host apparatus 10 writes and reads data in units of clusters. Upon receipt of the write data by the memory card 20, the received write data is placed into the data buffer 34. After the write data has all been received, the data is read from the data buffer 34 and written to the flash memory 23.

The data processing system performs its read operation as follows.

A read command and an address from which to read data are sent by the host apparatus 10 and received by the memory card 20. The data in question is then read from the address of the flash memory 23 and stored into the data buffer 34. After the data has all been read from the flash memory 23, the read data placed in the data buffer 34 is retrieved therefrom and sent to the host apparatus 10.

A memory control method embodying the present invention is outlined below.

Figure 3:
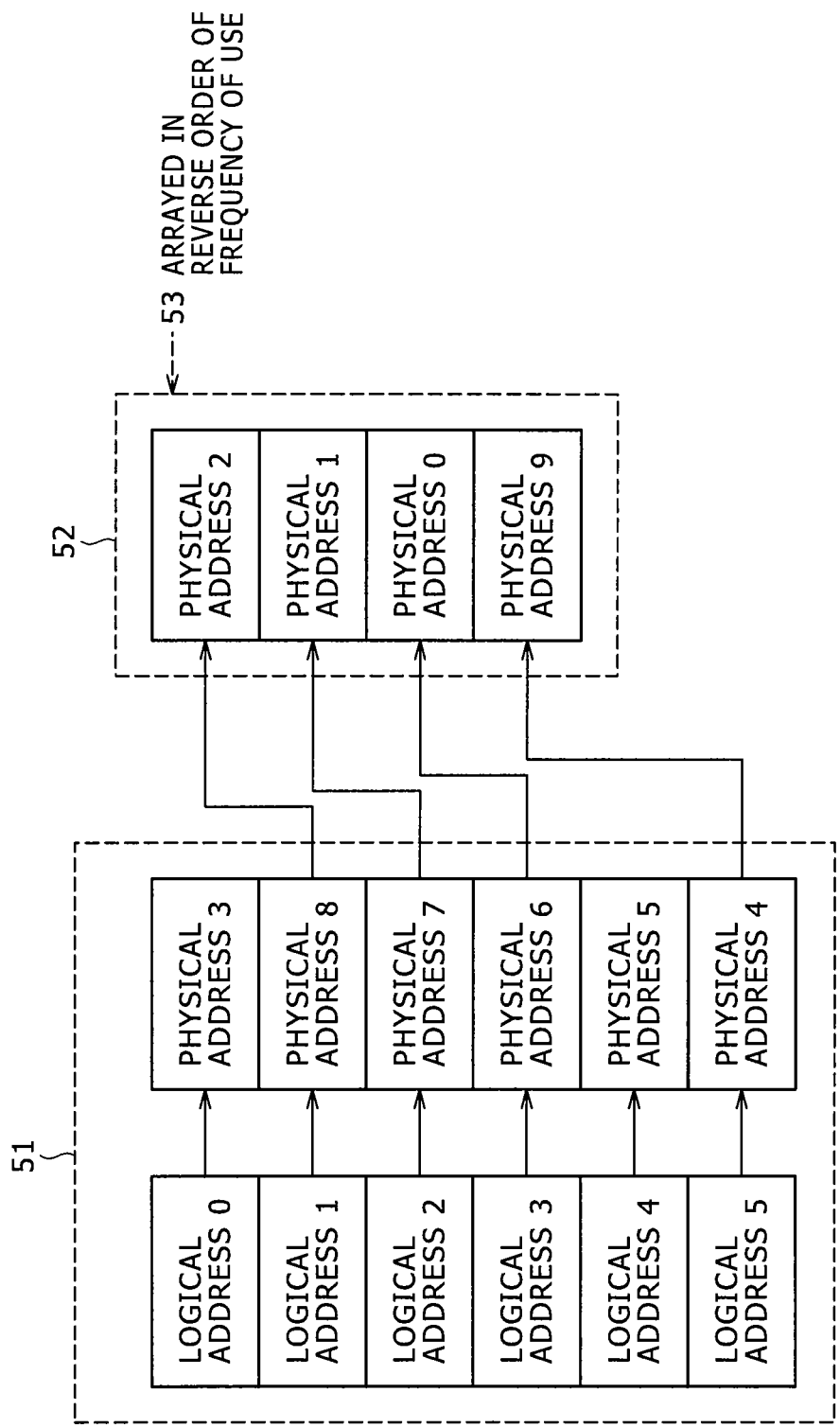
FIG. 3 is a schematic view showing how user data blocks correspond to cache blocks.

FIG. 3 schematically shows how user data blocks correspond to cache blocks. The flash memory 23 shown in FIGS. 1 and 2 contains a logical to physical conversion table 51 that specifies relations of correspondence between the logical and the physical addresses of user data blocks as illustrated in FIG. 3. The logical to physical conversion table 51 has logical block addresses 0, 1, 2, 3, 4 and 5 associated with physical block addresses 3, 8, 7, 6, 5 and 4 assigned to the logical blocks. When the memory card 20 is attached to the host apparatus 10, the logical to physical conversion table 51 is retrieved from the flash memory 23 by the controller section 30 and updated so as to reflect any writes to the table.

In the logical to physical conversion table 51, one of the physical block addresses 3, 8, 7, 6, 5 and 4 is associated with physical addresses 2, 1, 0 and 9 of cache blocks 52. As shown in FIG. 3, the physical addresses 2, 1, 0 and 9 are arrayed in ascending order of utilization of the cache blocks.

Illustratively, suppose that the physical block addresses 8, 7, 6 and 4 are associated with free physical blocks in the logical to physical conversion table 51. In such a case, the physical block addresses 8, 7, 6 and 4 are assigned to physical addresses 2, 1, 0 and 9 of new cache blocks formed by free cache blocks 52 from which data has been deleted. The physical addresses 2, 1, 0 and 9 of the new cache blocks 52 are arranged in ascending order of their utilization so that data may start to be written from the beginning of the cache blocks 52.

What follows is a description of preconditions applicable to the memory control method of the present invention.

Here are the definitions of some of the terms used in this specification.

The memory apparatus such as the memory card 20 in FIG. 2 has a plurality of flash memories 23 each containing a management area 41, a user data area 42, and a cache area 43. The blocks in the user data area 42 are called user data blocks, and the blocks in the cache area 43 are called cache blocks. The cache blocks are equal to the user blocks in size. The size of each of logical blocks obtained by dividing the logical space size of the cache blocks by user data block size is called a logical block size. The size of the logical space formed by a plurality of sectors in a user block is called a designated logical boundary. Blocks from which data is deleted are called free blocks. A new cache block may be acquired from among the free blocks.

A write-back is a process in which data in a cache block is written back to a user data block so that the state in which the cache block is currently used is replaced by the state in which no cache block is being used. At this point, a copy operation takes place because of the need to merge data between the user data block and the cache block. After the merge, the block that became unnecessary is deleted. Garbage collection refers to a copy operation performed preparatory to executing a write-back.

The cache blocks are explained below. There are two kinds of cache blocks, AD-cache and OD-cache. Whereas the number of allocated cache blocks is fixed, the number of AD-caches and that of OD-caches vary with the writes carried out by the host.

The AD-cache is a cache block intended to hold file data. The OD-cache type or AD-cache type to be used is determined by the write size. Where a new cache block is to be acquired for a write, an AD-cache block is selected if the write data is in excess of the designated logical boundary.

The first logical address to which data is initially written in an AD-cache block limits subsequent logical addresses to which to write data. If the logical address space in which the first write took place is located in a given logical block size space (A) and if the logical address space to which to write data next is within the logical space (A) and outside the written logical space of the cache block, then this cache block is available for the write.

The OD-cache is a cache block aimed at retaining FAT-bound management information or directory entries. The OD-cache type or AD-cache type to be used is determined by the write size. Where a new cache block is to be acquired for a write, an OD-cache block is selected if the write data size is short of the designated logical boundary.

The first logical address to which data is initially written in an OD-cache block limits subsequent logical addresses to which to write data. If the logical address space in which the first write took place is within a given designated logical boundary space (B) and if the logical address space to which to write data next is within the logical space (B), then this cache block is available for the write.

Information about the cache blocks, which is part of the management information, is explained below.

The management information includes information about how often each of the cache blocks has been updated, information about which cache block corresponds to which logical block, and information indicative of the first logical addresses of the cache blocks.

Information denoting the addresses of the written sectors in the cache blocks is not found in the management information. That information is acquired by a read from the cache blocks.

Information for distinguishing AD-cache blocks from OD-chache blocks is retained within the management information.

How the memory control method typically works will now be described according to an embodiment.

FIGS. 4 through 8 are flowcharts of steps constituting write operations. Specifically, the steps in FIGS. 4 through 8 represent typical write operations carried out on the flash memory 23 under control of the CPU 21.

Figure 4:
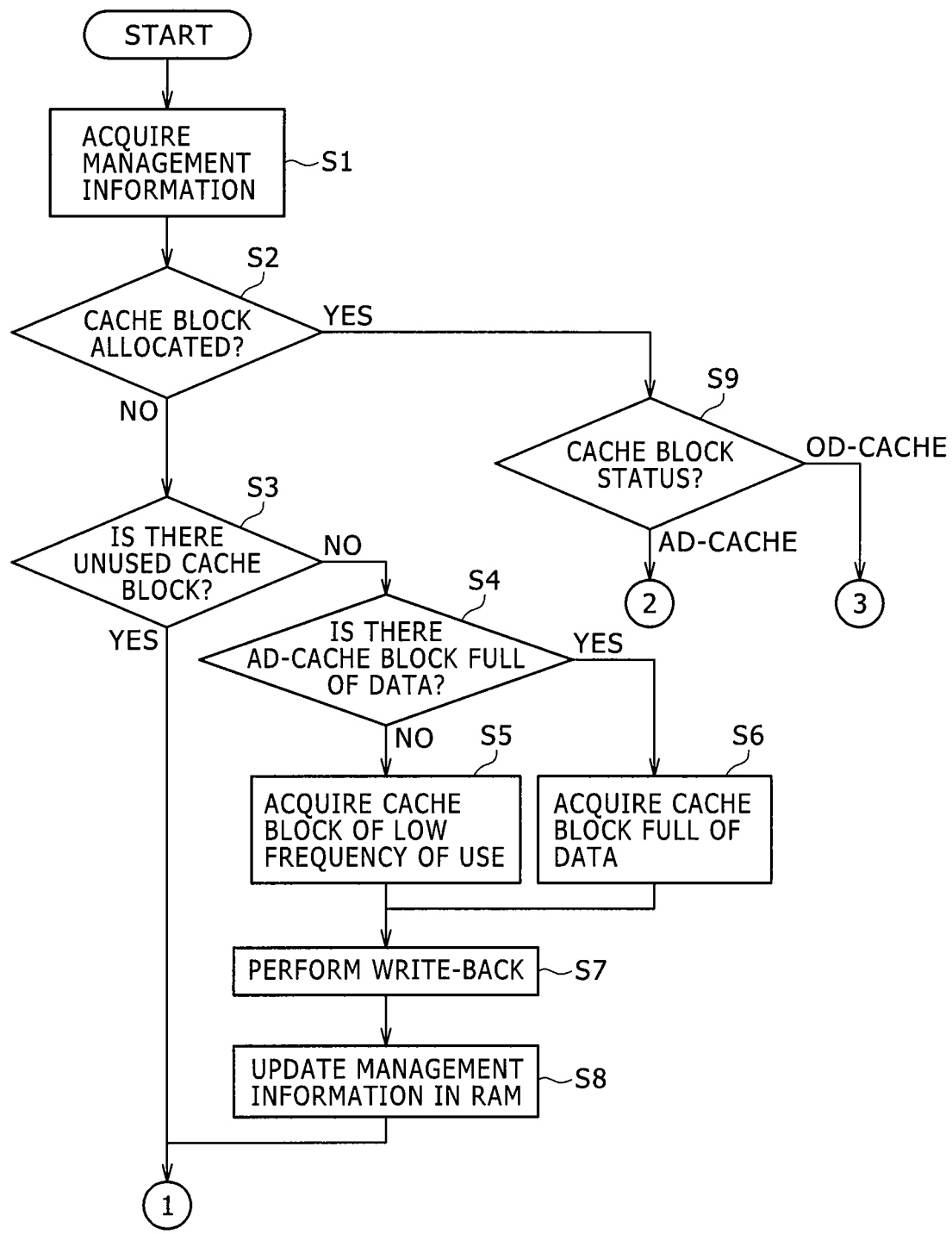
FIG. 4 is a flowchart of steps constituting write operations.

In step S1 of FIG. 4, the CPU 21 acquires from the management information in the management area 41 address information about the user data blocks and information about the written logical space regarding the user data area 42. The CPU 21 further acquires address information about the cache blocks and information about the written logical space regarding the cache area 43, the cache block addresses corresponding to the logical addresses of the user data blocks in the user data area 42. At this point, the CPU 21 obtains address information about new cache blocks (free blocks) in the cache area 43.

In step S2, the CPU 21 checks to determine whether there is any allocated cache block in the cache blocks being used. More specifically, step S2 constitutes the process by which to search for the cache block whose status is as shown in FIG. 15. FIG. 15 schematically shows status (two patterns) of a cache block (AD-cache) full of data written by the host.

The upper half of FIG. 15 shows first status in which logical sector addresses 0 through "n" in a cache block (AD-cache) 142, in alignment with their counterparts in a user data block 141, are filled with written data 143 and with write data 144 written from the host.

The lower half of FIG. 15 indicates second status in which logical sector addresses 2 through n and 0 through 1 in a cache block (AD-cache) 146, misaligned with the logical sector addresses 0 through n in a user data block 145, are filled with written data 147 and with write data 148 written from the host.

In the cache block status shown in FIG. 15, no further write can be made to the cache block. Since the data-filled cache block is of no use as a cache block, a write-back is performed preferentially to that block. If the cache block status is something other than what is shown in FIG. 15, the write-back operation is preferentially performed starting on the cache block with the lowest frequency of utilization (The twelfth writing means and the first preferential processing means).

If no allocated cache block is detected in step S2, the CPU 21 goes to step S3 and checks to determine whether there is an unused cache block. If an unused cache block is detected in step S3, control is passed on to step S10 and subsequent steps in FIG. 5. If an unused cache block is not detected in step S3, the CPU 21 goes to step S4 and checks to determine whether there is an AD-cache block full of data.

If no AD-cache block full of data is detected in step S4, the CPU 21 goes to step S5 and acquires the cache block with the lowest frequency of utilization at the moment. In step S7, the CPU 21 reallocates the acquired cache block to a logical sector address of the user data block in a write-back operation. In step S8, the CPU 21 updates the management information in the memory 22 and goes to step S10 and subsequent steps in FIG. 5.

If an AD-cache block full of data is detected step S4, the CPU 21 goes to step S6 and acquires the data-filled cache block. From step S6, the CPU 21 goes to step S7.

If an allocated cache block is detected in step S2, the CPU 21 goes to step S9 and checks to determine whether the detected cache block is an AD-cache block or an OD-cache block. If the detected cache block turns out to be an AD-cache block, the CPU 21 goes to step S21 and subsequent steps in FIG. 6. If the detected cache block is found to be an OD-cache block, the CPU 21 goes to step S31 and subsequent steps in FIG. 7.

Figure 5:
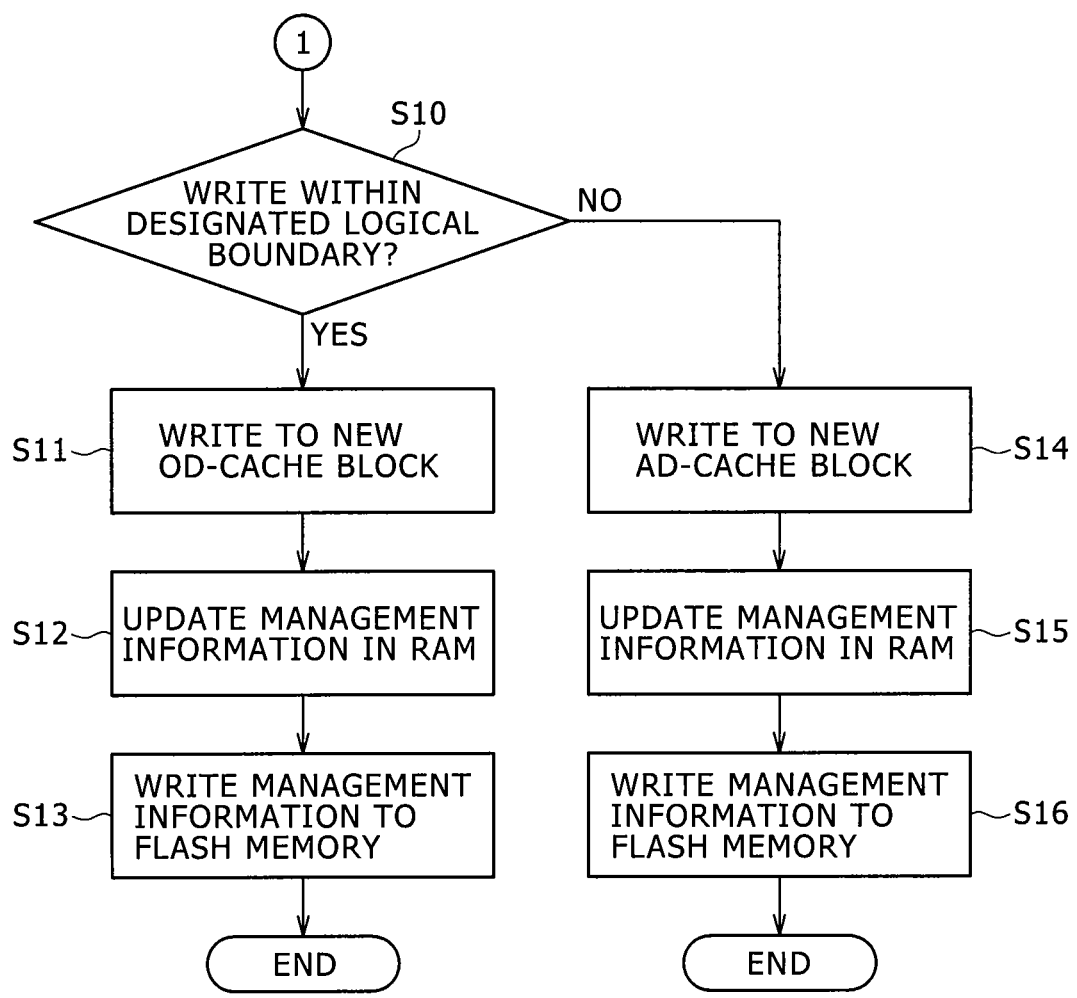
FIG. 5 is a flowchart of further steps constituting the write operations.

In step S10 of FIG. 5, the CPU 21 checks to determine whether a data write in excess of the designated logical boundary has occurred. If a data write in excess of the designated logical boundary is found to have occurred in step S10, the CPU 21 goes to step S14 and writes data to a new AD-cache block. When the write is made to the new AD-cache block in step S14, a write-back is suppressed. The write in step S14 is carried out from the beginning of the cache block without regard to logical addresses.

Figure 12:
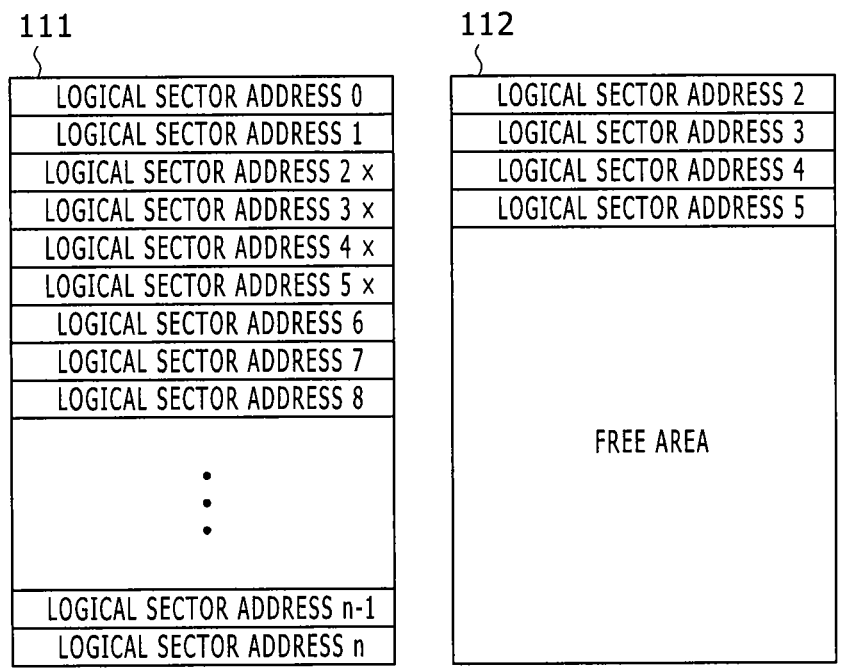
FIG. 12 is a schematic view showing status of a cache block and a user data block upon write in step S14.

FIG. 12 schematically shows status of a cache block and a user data block upon write in step S14.

Illustratively, following the data write to logical sector addresses 2 through 5 in a user data block 111 in FIG. 12, data is written to logical sector addresses 2 through 5 from the beginning of a cache block 112; the remaining space constitutes a free area (The first and second writing means).

Following the write in step S14, the CPU 21 goes to step S15 and updates the management information in the memory 22 so as to reflect the new allotment of the cache block 112 to the user data block 111. In step S16, the CPU 21 writes the management information to the management area 41.

Figure 6:
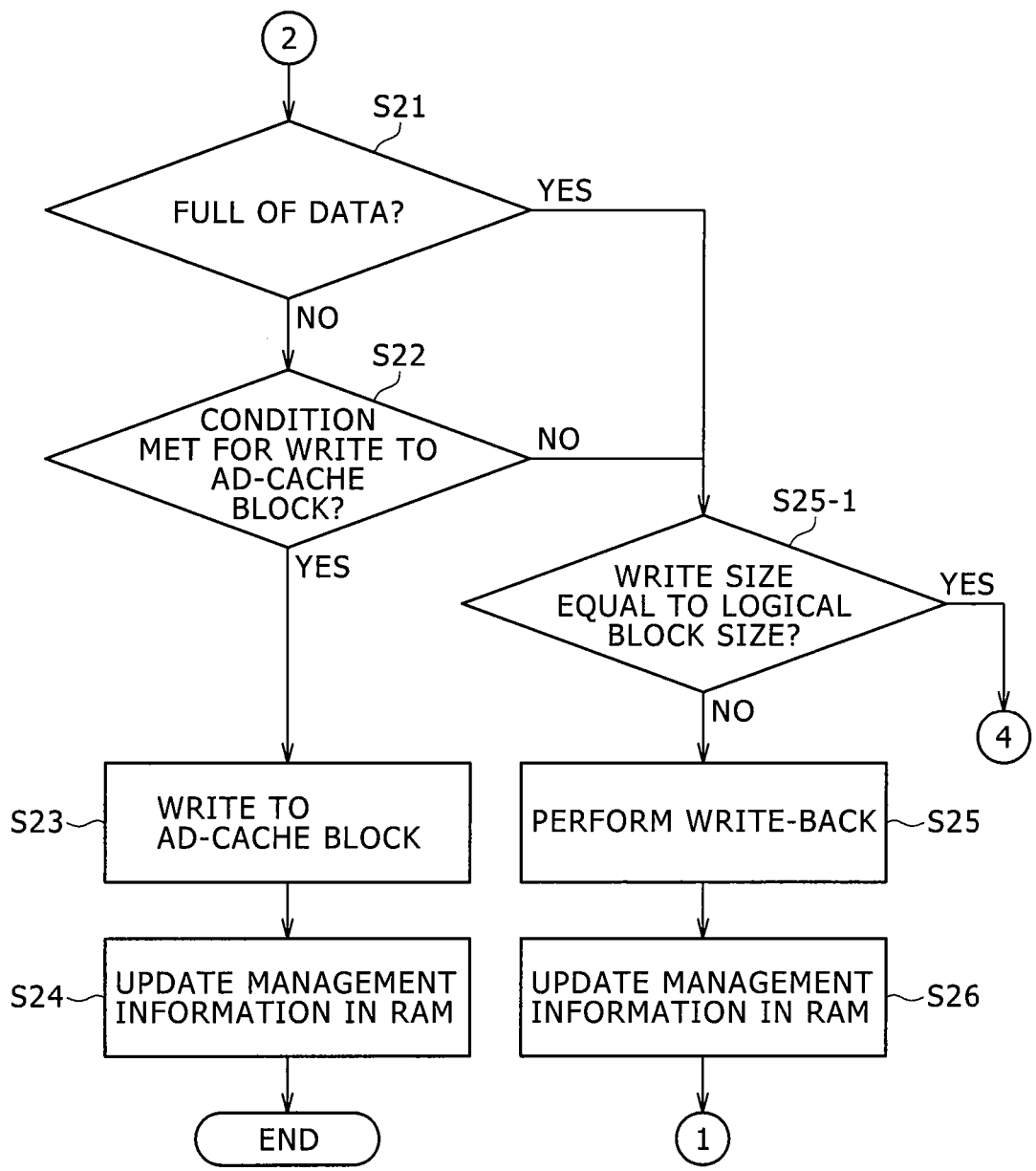
FIG. 6 is a flowchart of further steps constituting the write operations.

In step S21 of FIG. 6, the CPU 21 checks to determine whether the AD-cache block is solely made up of a written area, full of data. If the AD-cache block is not found solely made up of a written area, full of data in step S21, the CPU 21 goes to step S22 and checks to determine whether the condition for the write to the AD-cache block is met.

If in step S22 the condition is found met for the write to the AD-cache block, the CPU 21 goes to step S23 and writes data to the AD-cache block. In step S24, the CPU 21 updates the management information in the memory 22.

Figure 9:
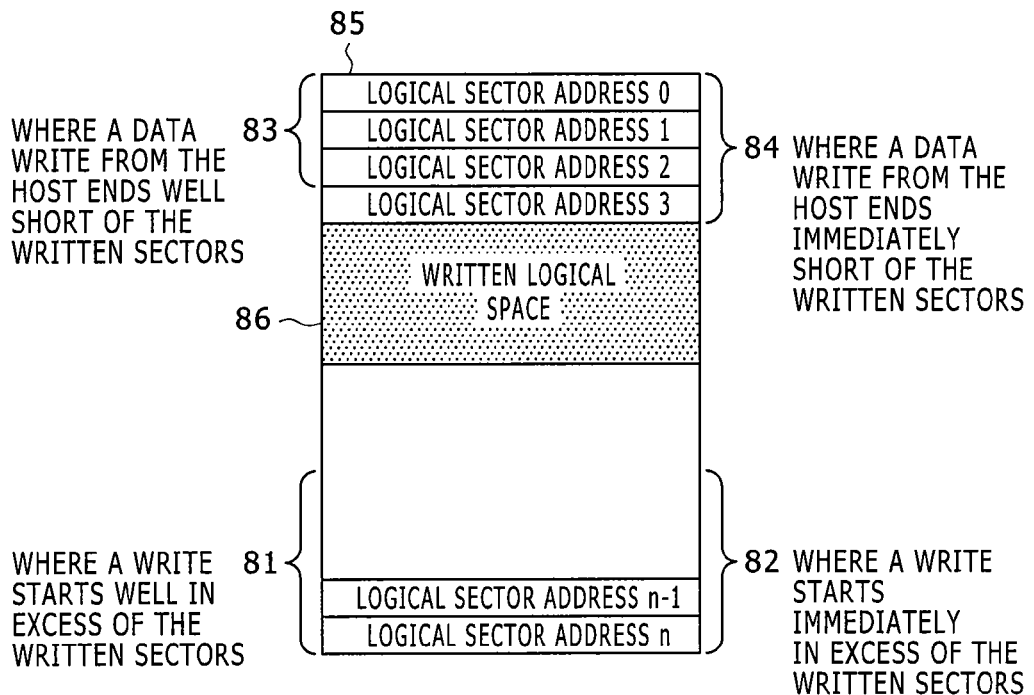
FIG. 9 is a schematic view showing a write pattern that meets the condition for the write in step S22.

Step S22 constitutes the process for determining whether the logical space to which to write data from now on corresponds to one of logical spaces 81 through 84 with regard to the written logical space in the cache block as shown in FIG. 9.

FIG. 9 schematically shows a write pattern that meets the condition for the write in step S22. In FIG. 9, the logical space 81 applies where a write starts well in excess of the written sectors; the logical space 82 is in effect where a write starts immediately in excess of the written sectors; the logical space 83 is applicable where a write from the host ends well short of the written sectors; and the logical space 84 is appropriate where a write from the host ends immediately short of the written sectors.

Step S23 is the process for having data written to the allocated cache block without starting a write-back. The write in step S23 starts immediately in excess of the written sectors in the cache block. If it is impossible to start the data write immediately beyond the written sector, a copy operation is performed up to the sector address from which the write can be started.

FIG. 13 schematically shows status of a cache block and a user data block upon write in step S23.

Illustratively, suppose that starting from the state of FIG. 12, a write has occurred to logical sector addresses 7 and 8 in a user data block 121 of FIG. 13. In such a case, a cache block 122 following the write holds data 123 written at logical sector addresses 2 through 5, has data 124 copied to logical sector address 6 from the user data block 121, and has data 125 written to logical sector addresses 7 and 8 from the host (The third and fourth writing means).

Following the write in step S23, there is no block address change in the cache block. That means no write takes place to the management area 41 for retaining the management information. Only the management information in the memory 22 is thus updated in step S24.

If the AD-cache block is found solely made up of a written area full of data in step S21, or if the condition for the write to the AD-cache block is not found met in step S22, then the CPU 21 goes to step S25-1 and checks to determine whether the write size is equal to the logical block size. If the write size is not found equal to the logical block size in step S25-1, then the CPU 21 goes to step S25 and executes a write-back. In step S26, the CPU 21 updates the management information in the memory 22.

Step S25 is the process for carrying out a write-back without triggering garbage collection if the AD-cache block is found to be formed by a written area full of data in the case of a data write taking place, as shown in FIG. 15. In this case, the cache block is registered in the management information as the user data block. The user data block in effect prior to the write-back is subjected to deletion, and the deleted block is registered as a free lock in the management information.

In step S25, it is also possible to carry out garbage collection so as to turn the current AD-cache block not filled with data into an AD-cache block full of data.

Figure 8:
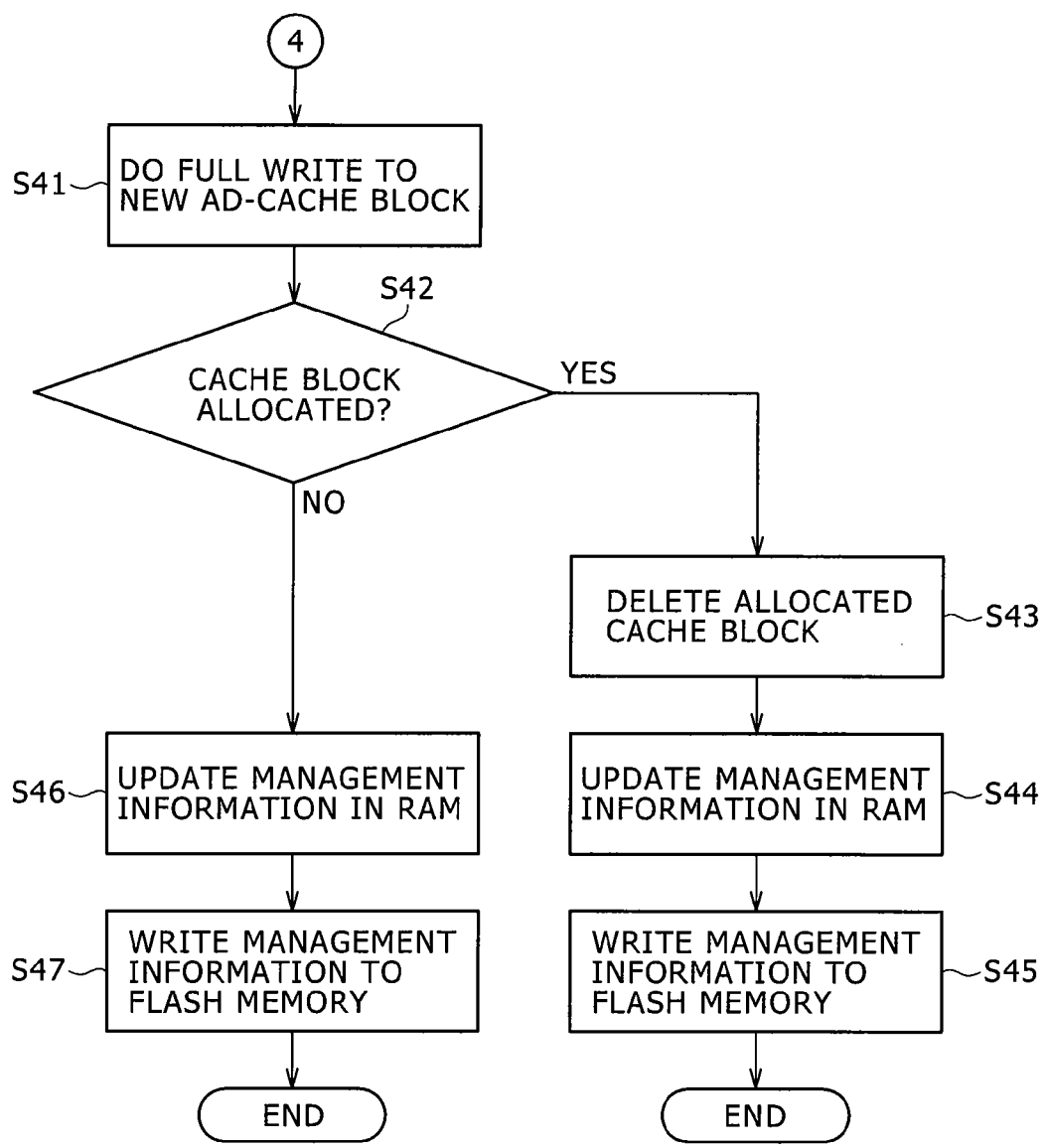
FIG. 8 is a flowchart of further steps constituting the write operations.

If the write size is found equal to the logical block size in step S25-1, then the CPU 21 goes to step S41 in FIG. 8 and effects a full write to the new AD-cache block. In step S42, the CPU 21 checks to determine whether the AD-cache block has already been allocated.

If the AD-cache block is found allocated in step S42, the CPU 21 goes to step S43 and deletes data from the allocated AD-cache block. Following the deletion of the allocated AD-cache block in step S43, the CPU 21 goes to step S44 and updates the management information in the memory 22 so as to reflect the deletion of the allocated cache block 112 with respect to the user data block 111. In step S45, the CPU 21 writes the management information to the management area 41.

If the AD-cache block is not found allocated in step S42, the CPU 21 goes to step S46 and updates the management information in the memory 22 so as to reflect the presence of the unallocated cache block 112 with regard to the user data block 111. In step S47, the CPU 21 writes the management information to the management area 41.

As described above, if the AD-cache block or an OD-cache block to be discussed later is found allocated, if a write takes place in a manner triggering a write-back, and if the write size is found equal to the logical block size, then the CPU performs a write to the new cache block without starting a write-back and deletes the old cache block.

With the write-back thus suppressed, the decrease in write performance attributable to garbage collection can be prevented. In this case, deletion takes place. Because garbage collection will not occur regardless of the allocation of the AD-cache block or of the OD-cache block to be discussed later, performance can be kept constant.

FIG. 14 schematically shows status of a cache block and a user data block upon write in step S25.

Illustratively, suppose that data 133 is currently written at logical sector addresses 2 through 7 in a cache block 132 with regard to logical sector addresses 0 through n in a user data block 131. In that case, data 134 is copied from the user data block 131 to logical sector addresses 8 through n and 0 through 1 in the cache block 132. When the cache block 132 is thus filled with data, a write-back may be carried out following by reallocation (The fifth and sixth writing means).

That is, as shown in FIG. 14, all data written in the user data block 131 is copied to the cache block 132. After the copy, the cache block 132 is registered in the management information in the memory 22 as the user data block 131. The user data block prior to the copy is subjected to deletion. The deleted block is registered as a free block in the management information in the memory 22.

The foregoing was a description of the write in excess of the designated logical boundary. What follows is an explanation of the write short of the designated logical boundary.

If a write is found to take place short of the designated logical boundary in step S10 of FIG. 5, the CPU 21 goes to step S11 and performs a write to a new OD-cache block. The use of the new OD-cache block in step S11 allows the write to be carried out without triggering a write-back. The write in step S11 is performed from the beginning of the cache block without regard to logical addresses.

FIG. 16 schematically shows status of a cache block and a user data block upon write in step S11.

Illustratively, suppose that a write has occurred to logical sector address 2 in a user data block 151. In such a case, following the write, data 153 is written by the host to logical sector address 2 from the beginning of a cache block 152, and then data 154 is copied from the user data block 151 to logical sector address 3 in the block 152. The two written addresses with the data 153 and 154 constitute a designated logical boundary 155; the rest of the cache block 152 is a free area (The sixth and seventh writing means).

Following the write in step S11 the CPU 21 goes to step S12 and updates the management information in the memory 22 to reflect the new allotment of the cache block 152 with respect to the user data block 151. In step S13, the CPU 21 writes the management information to the management area 41.

Step S11 is the process for carrying out a write without starting a write-back through the use of a cache block in the event of a write taking place short of the designated logical boundary. The data write in step S11 starts from the beginning of the cache block regardless of logical addresses.

Illustratively, a write to logical sector address 2 representing two sectors on the designated logical boundary 155 in FIG. 16 results in the cache block 152 as is shown in FIG. 16. That is, the data at logical sector address 2 is written to the beginning of the cache block 152, and any data is copied from the user data block 151 to logical sector address 3. Following the write and copy operations, the CPU 21 updates the management information in the memory 22 to reflect the new allotment of the cache block 152, and writes the updated information to the management area 41.

Figure 7:
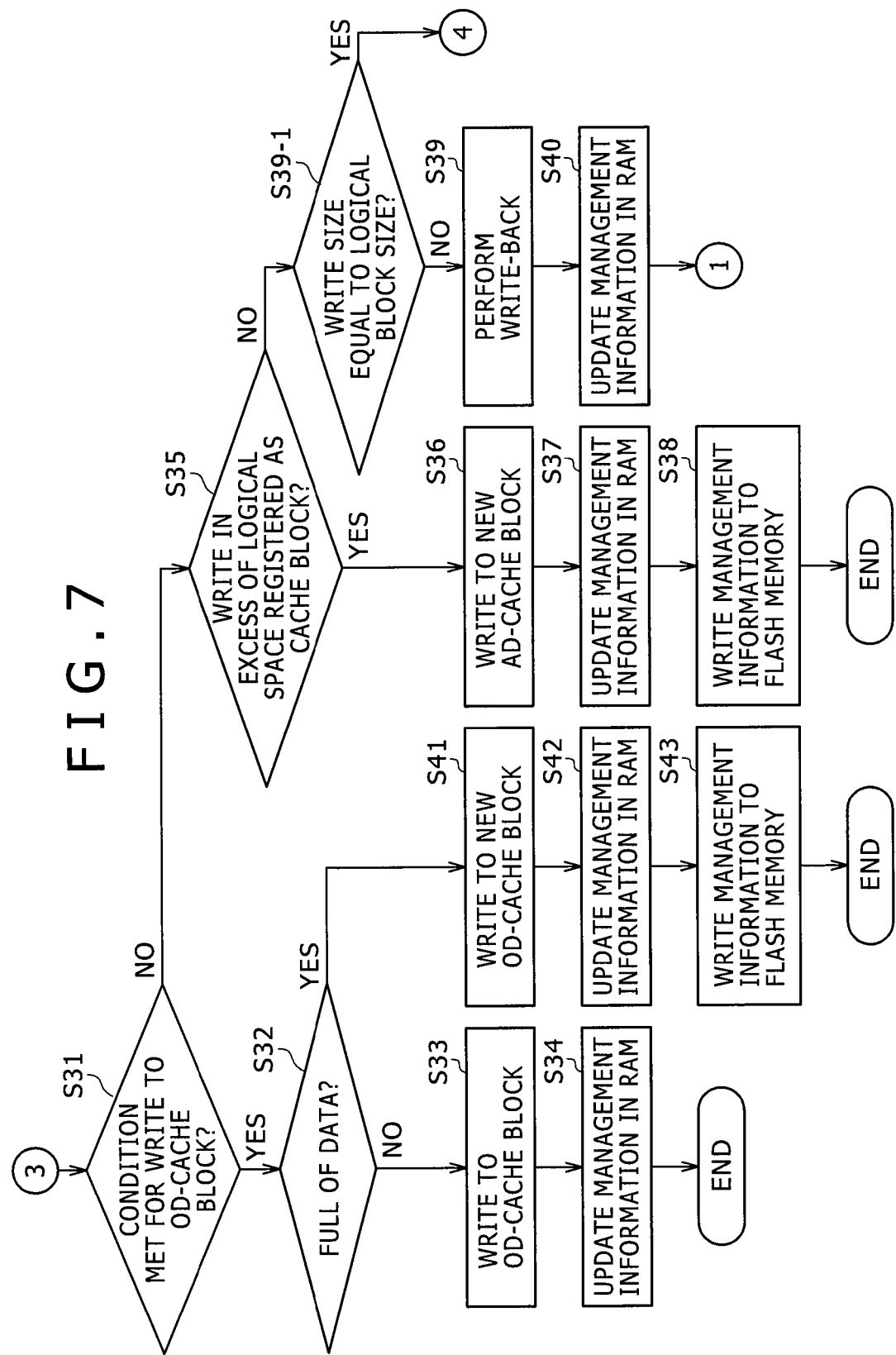
FIG. 7 is a flowchart of further steps constituting the write operations.

In step S31 of FIG. 7, the CPU 21 checks to determine whether the condition for a write to the OD-cache block is met. If the condition is found met for a write to the OD-cache block in step S31, the CPU 21 goes to step S32 and checks to determine whether the OD-cache block is solely made up of a written area full of data.

If the OD-cache block is not found full of data in step S32, the CPU 21 goes to step S33 and performs a write to the OD-cache block. In step S34, the CPU 21 updates the management information in the memory 22.

Figure 10:
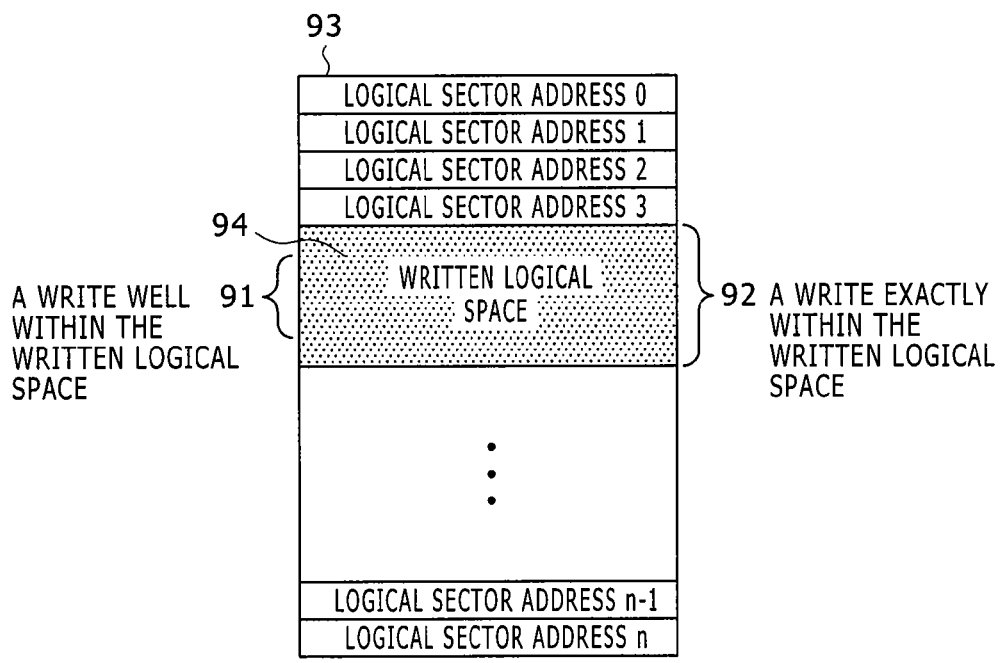
FIG. 10 is a schematic view showing a write pattern that meets the condition for the write in step S31.

Step S31 constitutes the process for determining whether the logical space to which to write data from now on corresponds to one of logical spaces 91 and 92 with regard to the written logical space in the cache block, as shown in FIG. 10.

FIG. 10 schematically shows a write pattern that meets the condition for the write in step S31. In FIG. 10, the logical space 91 applies where a write starts well within a written space 94, and the logical space 92 is in effect where a write starts exactly within the written space 94.

Step S33 is the process for having data written to the allocated cache block without starting a write-back. The write in step S33 starts immediately beyond the written sectors in the cache block.

FIG. 17 schematically shows status of a cache block and a user data block upon write in step S33.

Illustratively, suppose that another write has occurred to logical sector address 2 in a user data block 161 starting from the state shown in FIG. 16. In such a case, following the write of data 163 to logical sector addresses 2 and 3 in a cache block 162, data 164 is written by the host to logical sector address 2, and then data 165 is copied from the user data block 161 to logical sector address 3. The two written addresses with the data 164 and 165 constitute a designated logical boundary 166 (The eighth and ninth writing means).

Following the write in step S33, the CPU 21 goes to step S34 solely to update the management information in the memory 22. That is because with no block address change in the cache block, no write occurs to the management area 41 for retaining the management information.

If the condition for the write to the OD-cache block is not found met in step S31, the CPU 21 goes to step S35 and checks to determine whether the write starts beyond the logical space registered as the OD-cache block.

Figure 11:
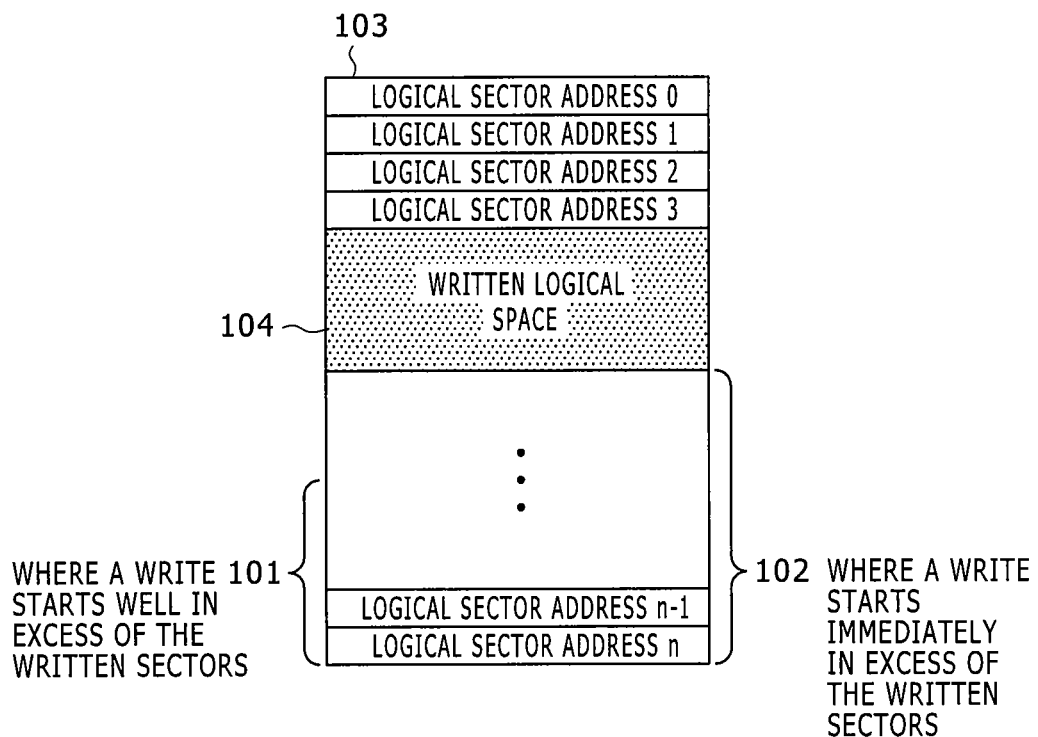
FIG. 11 is a schematic view showing a write pattern that meets the condition for the write in step S35.

Step S35 constitutes the process for determining whether the logical space to which to write data from now on corresponds to one of logical spaces 101 and 102 with regard to the written logical space in the cache block as shown in FIG. 11.

FIG. 11 schematically shows a write pattern that meets the condition for the write in step S35. In FIG. 11, the logical space 101 applies where a write starts well in excess of a written space 104, and the logical space 102 is in effect where a write starts immediately in excess of the written space 104.

If the write is not found to occur in excess of the logical space registered as the OD-cache block in step S35, the CPU 21 goes to step S39-1 and checks to determine whether the write size is equal to the logical block size. If the write size is not found equal to the logical block size in step S39-1, the CPU 21 goes to step S39 and performs a write-back. In step S40, the CPU 21 updates the management information in the memory 22.

Step S39 is the process for acquiring a new AD-cache block and executing a write-back in the case of a data write taking place.

Figure 18:
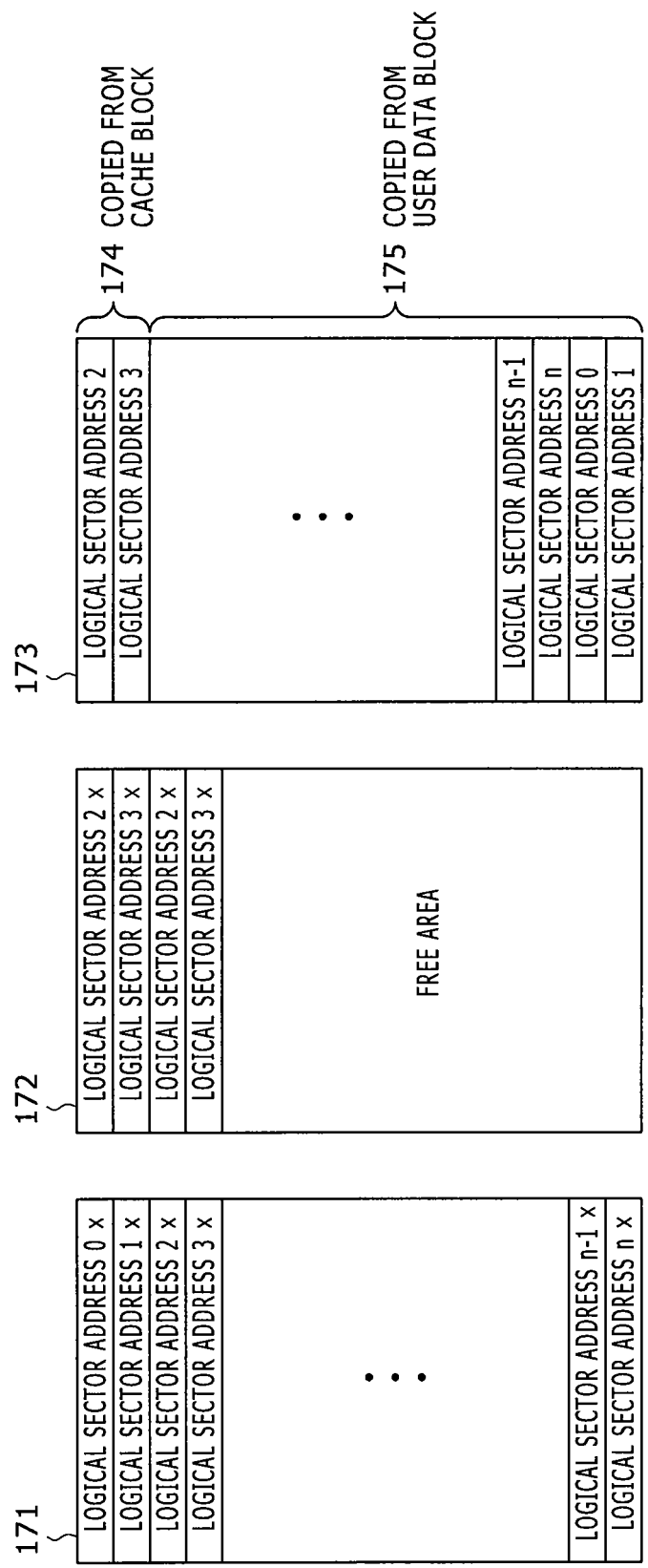
FIG. 18 is a schematic view showing status of a cache block and a user data block upon write in step S39.

FIG. 18 schematically shows status of a cache block and a user data block upon write in step S39.

Illustratively, the data currently written at logical sector addresses 2 and 3 in a cache block 172 is copied from there into a new cache block 173 as data 174. Thereafter, the data written at other logical sector addresses 4 through n and 0 through 1 in a user data block 171 is copied from there into the new cache block 173 as data 175. For example, executing the write-back in step S39 in the state of FIG. 17 brings about the status of FIG. 18. Following the copy resulting from the write-back in step S39, the new cache block 173 is registered in the management information as the user data block 171. The old user data block 171 is deleted, and the deleted block is registered as a free block in the management information (The thirteenth writing means and the first preferential processing means).

If the OD-cache block is found to be a written area full of data in step S32, the CPU 21 goes to step S41 and performs a write to a new OD-cache block. The use of the new OD-cache block in step S41 allows the write to be carried out without triggering a write-back. The write in step S41 is performed from the beginning of the cache block without regard to logical addresses.

Following the write in step S41, the CPU 21 goes to step S42 and updates the management information in the memory 22 to reflect the new allotment of the cache block with respect to the user data block. In step S43, the CPU 21 writes the management information to the management area 41.

Step S41 is the process for acquiring a new OD-cache block for a cache block update without executing a write-back in the event of a data write taking place.

Figure 19:
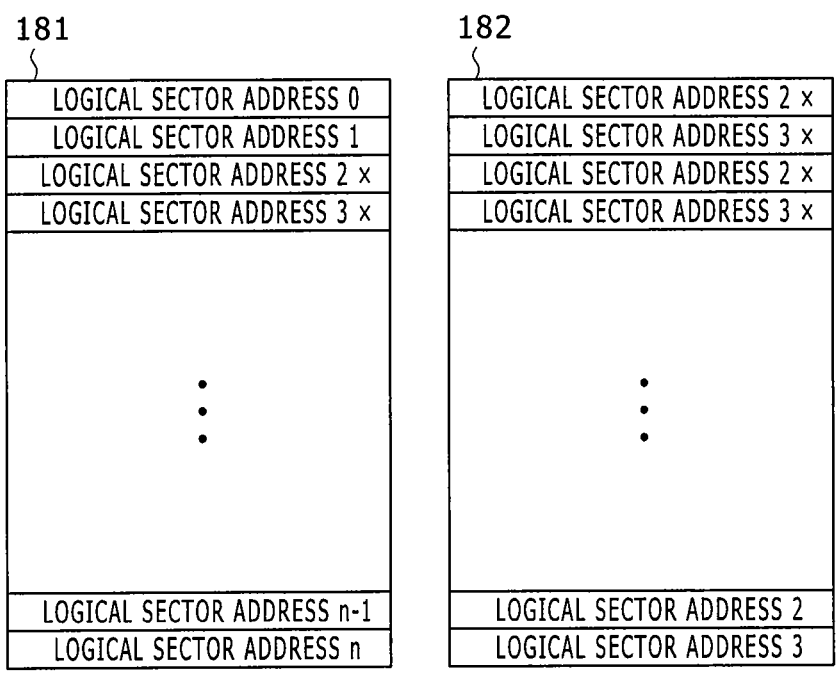
FIG. 19 is a schematic view showing status of a cache block and a user data block prior to the write in step S41.

FIG. 19 schematically shows status of a cache block and a user data block prior to the write in step S41.

Figure 20:
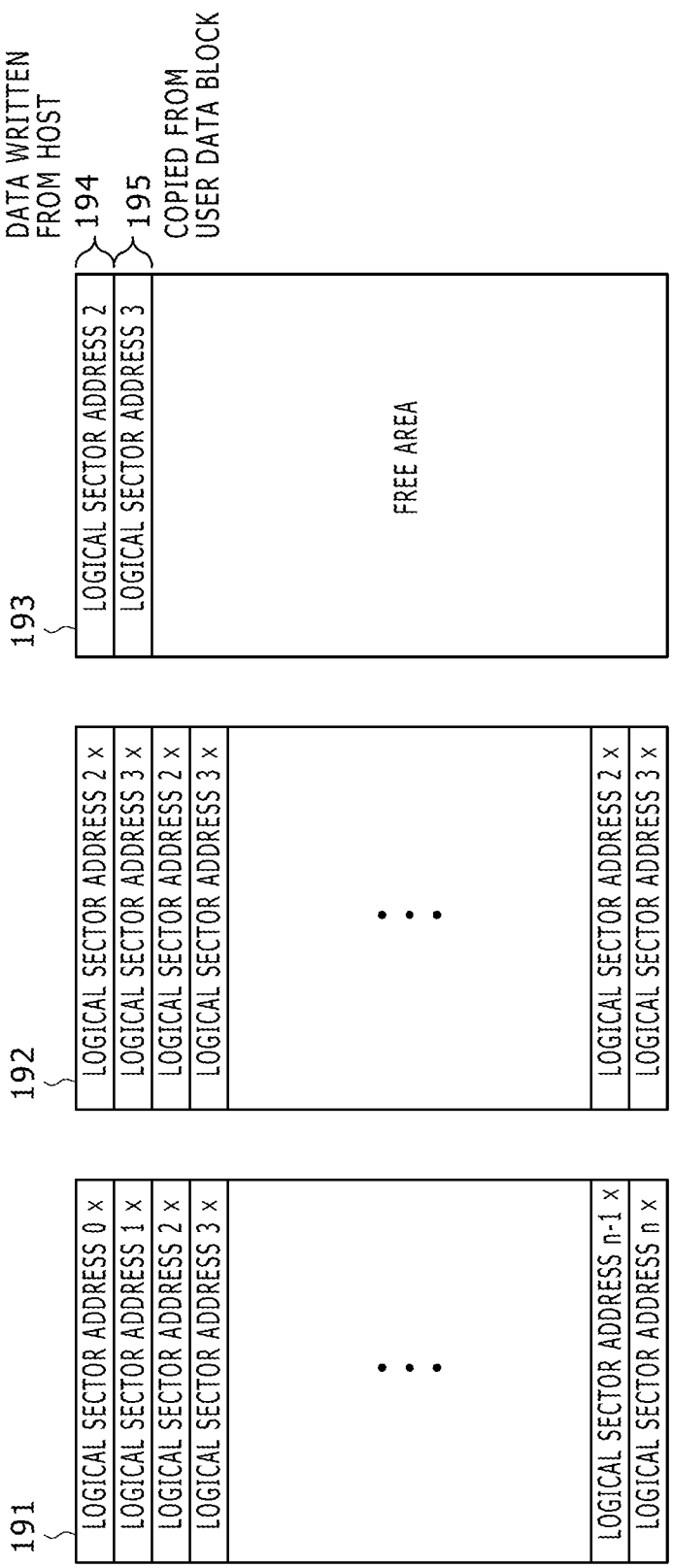
FIG. 20 is a schematic view showing status of a cache block and a user data block after the write in step S41.

FIG. 20 is a schematic view showing status of a cache block 192 and a user data block 191 after the write in step S41.

Illustratively, suppose that another write has occurred to logical sector address 2 starting from the status of a cache block 182 and a user data block 181 in FIG. 19. In such a case, as shown in FIG. 20, data 194 is written by the host to logical sector address 2 at the beginning of a new cache block 193, and then data 195 is copied from the user data block 191 to logical sector address 3. Upon completion of the copy in step S41, the new cache block 193 is registered in the management information as the new user data block 191. The old user data block 191 is deleted, and the deleted block is registered as a free block in the management information (The tenth writing means).

If a write is found to occur in excess of the logical space registered as the OD-cache block in step S35, the CPU 21 goes to step S36 and performs a write to a new AD-cache block. The use of the new AD-cache block in step S36 allows the write to be carried out without triggering a write-back. The write in step S36 is performed from the beginning of the cache block without regard to logical addresses.

Figure 21:
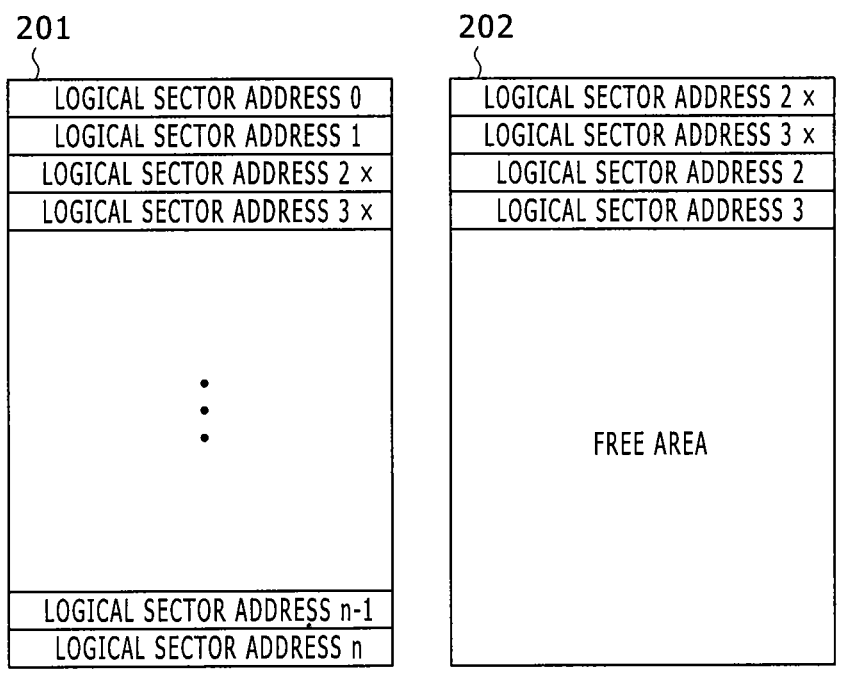
FIG. 21 is a schematic view showing status of a cache block and a user data block prior to the write in step S36.

FIG. 21 schematically shows status of a cache block and a user data block prior to the write in step S36.

Figure 22:
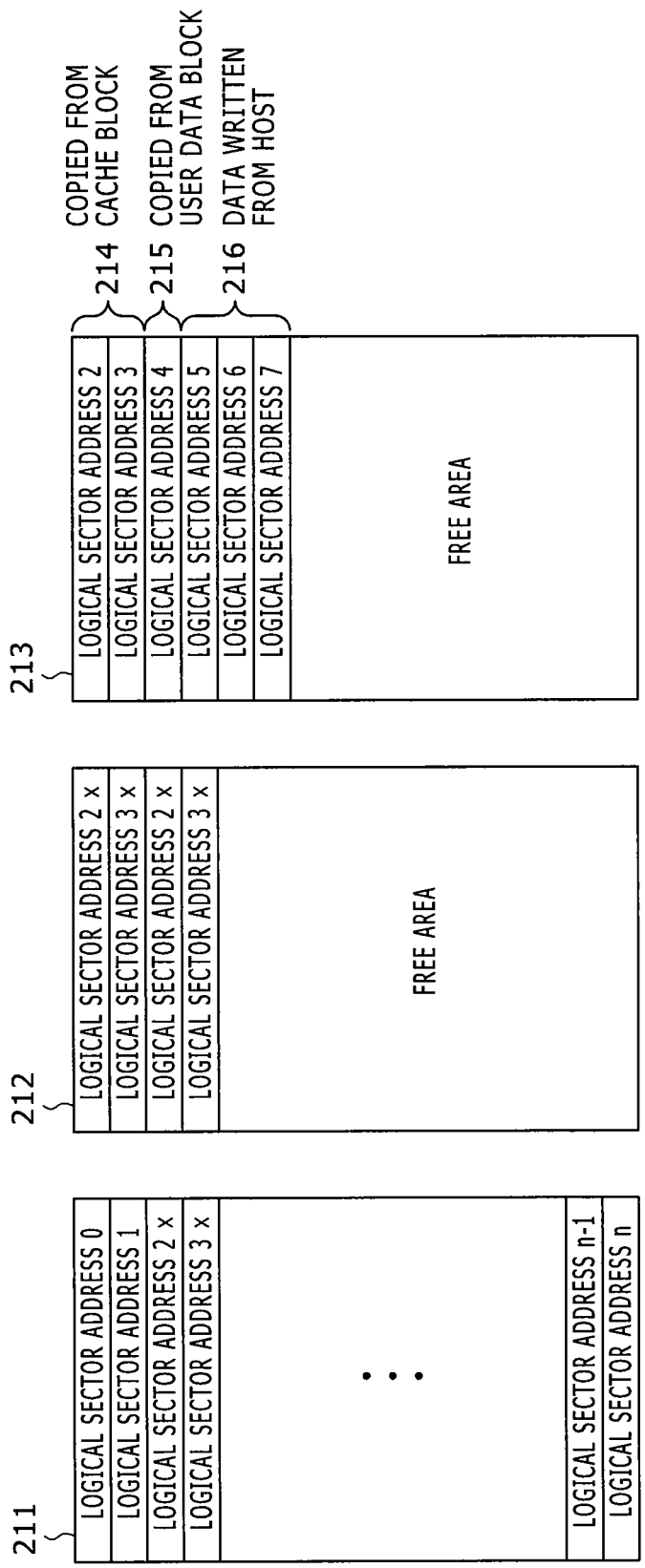
FIG. 22 is a schematic view showing status of a cache block and a user data block after the write in step S36.

FIG. 22 is a schematic view showing status of a cache block and a user data block after the write in step S36.

Illustratively, suppose that where a cache block 202 and a user data block 201 are provided as illustrated in FIG. 21, a write has occurred to logical addresses 5 through 7 in the user data block 201. In that case, as shown in FIG. 22, data 214 is copied from a cache block 212 to the beginning of a new cache block 213, and then data 215 is copied from a user data block 211 to logical sector address 4 in the new cache block 213. Following the copy of the data 215, data 216 is written by the host to logical sector addresses 5 through 7 in the cache block 213 (The eleventh writing means).

Upon completion of the write in step S36, the CPU 21 goes to step S37 and updates the management information in the memory 22 to reflect the new allotment of the cache block 213 with regard to the user data block 211. In step S38, the CPU 21 writes the management information to the management area 41.

Step S36 is the process for performing a write without triggering a write-back by acquiring a new AD-cache block in the event of a write taking place in a manner meeting the condition of step S35.

Prior to the write in step S36, the data 214 is copied to the new cache block 213 from the cache block 212. Then the write is started from the sector immediately after the copied data 214. If it is impossible to start the write immediately after the copied data, then the data 214 is copied from the user data up to a write start sector address. Following the write in step S36, the new cache block 213 is registered in the management information as the new cache block 212, and the old cache block 212 is deleted.

If the write size is not found equal to the logical block size in step S39-1, the CPU 21 goes to step S41 and performs a full-write to the new AD-cache block. In step S42, the CPU 21 checks to determine whether the AD-cache block has already been allocated.

If the AD-cache block is found allocated in step S42, the CPU 21 goes to step S43 and deletes the allocated AD-cache block. Following the deletion of the AD-cache block in step S43, the CPU 21 goes to step S44 and updates the management information in the memory 22 to reflect the deletion of the allocated cache block 112 with regard to the user data block 111. In step S45, the CPU 21 writes the management information to the management area 41.

If the AD-cache block is not found allocated in step S42, the CPU 21 goes to step S46 and updates the management information in the memory 22 to reflect the presence of the unallocated cache block 112 with regard to the user data block 111. In step S47, the CPU 21 writes the management information to the management area 41.

As described, if a write occurs in a manner triggering a write-back when the OD-cache block or the AD-cache block discussed above has already been allocated, and if the write size is found equal to the logical block size, then the CPU 21 performs the write to the new cache block without starting a write-back and deletes the old cache block.

With the write-back thus suppressed, the decrease in write performance attributable to garbage collection can be prevented. In this case, deletion takes place. Because garbage collection will not occur regardless of the allocation of the AD-cache block or of the OD-cache block discussed above, performance can be kept constant.

Figure 23:
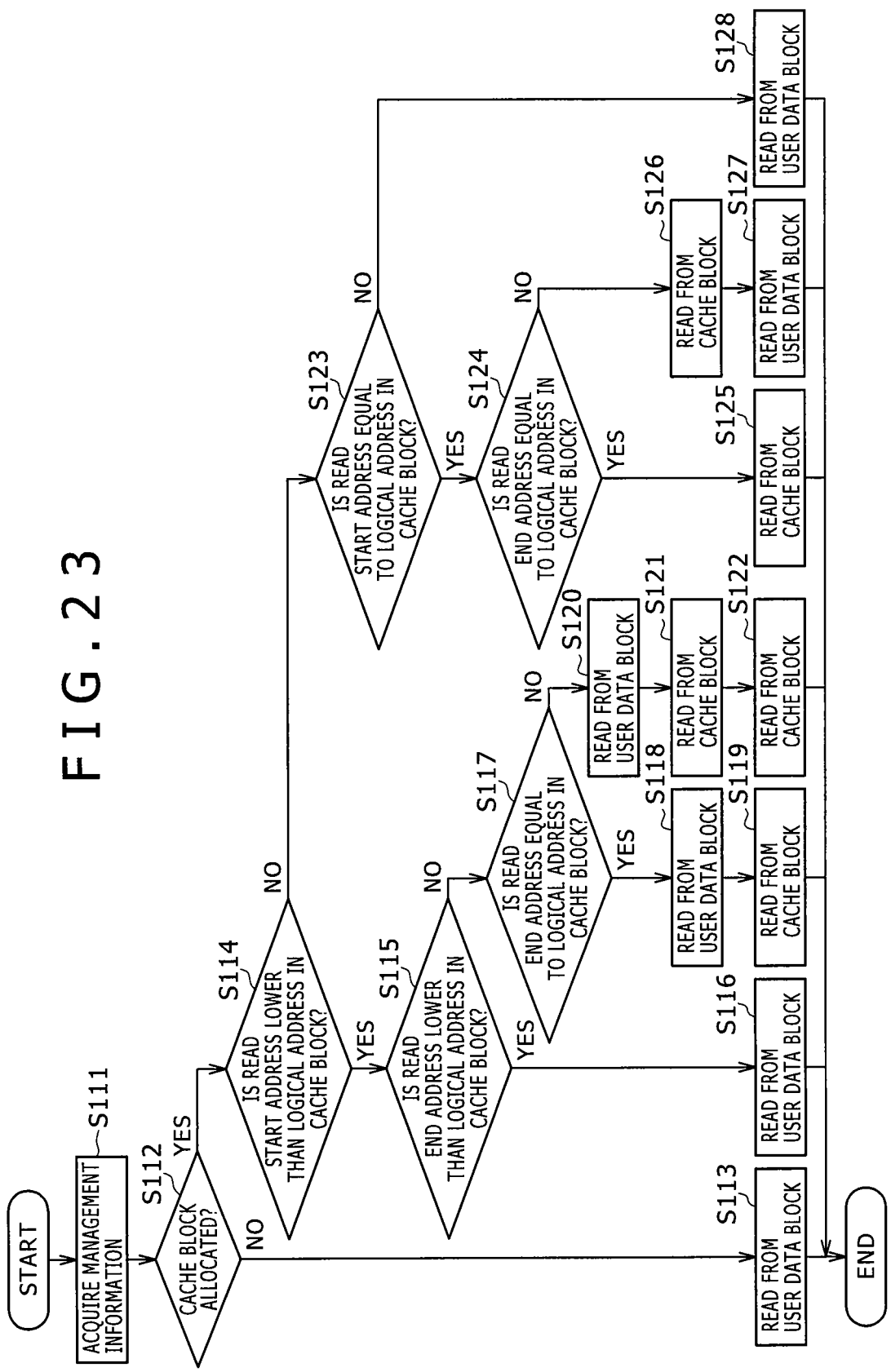
FIG. 23 is a flowchart of steps constituting read operations in units of logical blocks.

FIG. 23 is a flowchart of steps constituting read operations in units of logical blocks.

In step S111 of FIG. 23, the CPU 21 acquires from the management information both address information and written logical space information about the user data block, as well as address information and written logical space information about the cache block corresponding to the logical address in effect.

In step S112, the CPU 21 checks to determine whether the cache block has been allocated with regard to the user data block. If the cache block is not found allocated with respect to the user data block in step S112, the CPU 21 goes to step S13, reads the data from the user data block, and supplies the retrieved data to the host. Step S113 is carried out when no cache block is allocated to the logical block from which data is requested to be read.

If the cache block is found allocated with regard to the user data block in step S112, the CPU 21 goes to step S114 and checks to determine whether the read start address is lower than the logical address in the cache block. If the read start address is found to be lower than the logical address in the cache block in step S114, the CPU 21 goes to step S115 and checks to determine whether the read end address is lower than the logical address in the cache block. If the read end address is found lower than the logical address in the cache block in step S115, the CPU 21 goes to step S116, reads the data from the user data block, and supplies the retrieved data to the host.

If the read start address is not found to be lower than the logical address in the cache block in step S114, the CPU 21 goes to step S123 and checks to determine whether the read start address is equal to the logical address in the cache block. If the read start address is not found equal to the logical address in the cache block in step S123, the CPU 21 goes to step S128, reads the data from the user data block, and supplies the retrieved data to the host.

Steps S116 and S118 are carried out when the cache block is allocated but the data at the logical address from which data is requested to be read does not exist in the cache block. These are the processes whereby data is read from the user data block and sent out to the host.

If the read end address is not found lower than the logical address in the cache block in step S115, the CPU 21 goes to step S117 and checks to determine whether the read end address is equal to the logical address in the cache block. If the read end address is found equal to the logical address in the cache block in step S117, the CPU 21 goes to step S118 and reads the data from the user data block. In step S119, the CPU 21 reads the remaining data from the cache block and supplies the retrieved data to the host.

If the read end address is not found equal to the logical address in the cache block in step S117, the CPU 21 goes to step S120 and reads the data from the user data block. In step S121, the CPU 21 reads subsequent data from the cache block. In step S122, the CPU 21 reads the remaining data from the cache block and supplies the retrieved data to the host.

If the read start address is found equal to the logical address in the cache block in step S123, the CPU 21 goes to step S124 and checks to determine whether the read end address is equal to the logical address in the cache block. If the read end address is found equal to the logical address in the cache block in step S124, the CPU 21 goes to step S125, reads the data from the cache block, and supplies the retrieved data to the host.

If the read end address is not found equal to the logical address in the cache block in step S124, the CPU 21 goes to step S126 and reads the data from the cache block. In step S127, the CPU 21 reads the remaining data from the user data block and supplies the retrieved data to the host.

Steps S118 and S119, S120 through S122, and S126 and S127 are processes whereby data is read from both the user data block and the cache block. First to be read out is the data retrieved from the user data block for output to the host. Later, if the data corresponding to the logical sector address requested by the host is found in the cache block, then the data is read from the cache block into the host; if the data in question does not exist in the cache block, the data is read from the user data block into the host.

Step S125 is the process for reading the data from the cache block into the host.

As discussed above, because the nonvolatile memory (NAND-type flash memory) in the form of the flash memory 23 cannot be overwritten with data and because data is deleted from the memory in units of blocks, the memory apparatus in the form of the memory card 20 typically needs to have its update data retained in different blocks on a block by block basis regardless of the size of the update data. That operation is carried out to maintain the consistency of the logical to physical conversion table.

For that reason, it is necessary to copy the data other than the update data in each original block. An update of such a block produces a block containing unnecessary data, and this block needs to be deleted (in a write-back). Furthermore, the blocks are subject to constraints on the number of times data can be deleted therefrom.

With this embodiment, the block controlling scheme based on the cache block arrangement makes the incidence of write-back less frequent than typical memory apparatuses. The fewer write-back operations translate into less frequent occurrence of copy and deletion, thereby improving the speed at which to update data. With block data deletion count lowered, the service life of the memory apparatus can be extended.

With the above features in place, the host may write file data in excess of the designated logical boundary representing the logical space size in units of a plurality of sectors. In such a case, the write is effected to a new cache block so as to suppress a write-back. Inhibiting the write-back keeps garbage collection in check and thereby enhances write performance. With the write-back suppressed, the frequency of block data deletion is reduced and the service life of the product is extended accordingly.

A write by the host is arranged to involve writing data from the beginning of the cache block regardless of the logical address space to which to write the data. This arrangement suppresses any data copy within the cache block, which in turn boosts write performance.

If the above-mentioned write is followed by a consecutive write of file data without regard to the cluster boundary, the additional data may be written to the cache block in order to suppress a write-back. With the write-back held in check, garbage collection is prevented and write performance is improved accordingly. Since suppression of the write-back reduces the frequency of block data deletion, the service life of the product is extended. When only the block addresses of the cache block are properly managed, there is no need to update the management information if there is no block address change. This also contributes to improving write performance. Where the frequency of management information update is reduced, it is possible to lower the number of times data deletion is performed on the blocks where the management information is registered. This helps extend the service life of the product.

Where additional data is written to the cache block in order to suppress a write-back, garbage collection is prevented and write performance is enhanced. With the write-back kept in check, the number of times data deletion is performed on the blocks is reduced and the service life of the product is extended accordingly. When only the block addresses of the cache block are properly managed, there is no need to update the management information if there is no block address change. This also contributes to improving write performance. Where the frequency of management information update is reduced, it is possible to lower the number of times data deletion is performed on the blocks where the management information is registered. This helps extend the service life of the product.

When the cache block is full of data, a write-back may be performed on the user block without triggering garbage collection. This also contributes to improving write performance.

When the host is to write FAT-destined management information or a directory entry short of the designated logical boundary defining the logical space size in units of a plurality of sectors, the data is written to a new cache block so that a write-back will not take place. With the write-back suppressed, garbage collection is prevented and write performance is improved accordingly. The suppression of write-back operations lowers the frequency of data deletion from the blocks, whereby the service life of the product is extended.

Following a write to a logical address space, another write may occur to the same logical address space. In that case, the additional data is written to the cache block so as to suppress a write back. With the write-back held in check, garbage collection is inhibited and write performance is improved. Suppressing the write-back reduces the frequency of data deletion from the blocks, whereby the service life of the product is extended. When only the block addresses of the cache block are properly managed, there is no need to update the management information if there is no block address change. This also contributes to improving write performance. Where the frequency of management information update is reduced, it is possible to lower the number of times data deletion is performed on the blocks where the management information is registered. This helps extend the service life of the product.

A write-back may be suppressed by having additional data written to the cache block. With the write-back held in check, garbage collection is suppressed and write performance is improved. Because preventing the write-back lowers the frequency of data deletion from the blocks, the service life of the product is extended. When only the block addresses of the cache block are properly managed, there is no need to update the management information if there is no block address change. This also contributes to improving write performance. Where the frequency of management information update is reduced, it is possible to lower the number of times data deletion is performed on the blocks where the management information is registered. This helps extend the service life of the product.

Where a write occurs with the cache block full of data, a write-back may be suppressed by having the data written to a different cache block. When the write-back is inhibited in this manner, garbage collection is prevented and write performance is improved. With the write-back held in check, the frequency of data deletion from the blocks is lowered and the service life of the product is extended accordingly.

In the event of a file data write following the write of FAT-destined management information or of a directory entry, the data may be written to a different cache block in order to suppress a write-back. With the write-back thus held in check, garbage collection is inhibited and write performance is improved. Because suppression of the write-back lowers the frequency of data deletion from the blocks, the service life of the product is extended.

Where there is no free cache block, a write-back operation is performed on the cache blocks preferentially in ascending order of their data update frequency. The cache blocks of low data update frequency starting from the one whose data update frequency is the lowest are preferentially subjected to write-back operations. This boosts the efficiency of cache block utilization in terms of data writes. That is because the cache blocks with lower levels of data update frequency are less likely to undergo writes than the blocks with higher levels of data update frequency. When the efficiency of cache block utilization is raised in terms of writes, the write-back is suppressed. This inhibits garbage collection and thereby improves write performance. The suppression of write-back operations lowers the frequency of data deletion from the blocks, whereby the service life of the product is extended.

Where there is no free cache block available for a write-back, the cache blocks full of data are preferentially subjected to garbage collection. The preferential write-back to the written cache blocks raises the efficiency of cache block utilization in terms of data writes because where there is no free cache block, there is no need to use the cache blocks. The improved efficiency of cache block utilization in terms of data writes inhibits garbage collection and thereby boosts write performance. The suppression of write-back operations lowers the frequency of data deletion from the blocks, whereby the service life of the product is extended. The absence of free cache blocks eliminates the need for performing a copy on the blocks through garbage collection, whereby overall performance is enhanced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A memory apparatus comprising:
    a nonvolatile memory configured to have data written thereto and read therefrom in units of clusters and to have data deleted therefrom in units of blocks each formed by a plurality of sectors; and
    a control circuit configured to control said nonvolatile memory in operation;
    said nonvolatile memory including:
        (a) a management area in which to record management information;
        (b) a user data area in which to record data coming from a user, said user data area including logical blocks, said logical blocks having first addresses, wherein first physical blocks are assigned to said first addresses, said first physical blocks having second addresses; and
        (c) a cache area in which to hold temporarily the data to be written to and read from said user data area, said cache area including second physical blocks, said second physical blocks having third addresses arranged in ascending order based on utilization;
    said management area including:
        (a) a logical to physical conversion table retaining relations of correspondence between:
            (i) said first addresses of said logical blocks in said user data area; and
            (ii) said second addresses of said first physical blocks assigned to said first addresses of said logical blocks in said user data area; and
        (b) said third addresses of said second physical blocks in said cache area corresponding to the second addresses of said first physical blocks assigned to said first addresses of said logical blocks; and
    said control circuit including:
        (a) determination means for determining whether a data write from a host apparatus to a user data block of said user data area is in excess of a designated logical boundary which defines a logical space size in units of a plurality of sectors within the user data block of said user data area;
        (b) first writing means for writing, to a deleted new cache block in said cache area, data from the host apparatus determined to be in excess of the designated logical boundary; and
        (c) second writing means for having the data written starting from the beginning of said new cache block upon data write by said first writing means to said new cache block, regardless of the logical address space of said new cache block.

2. The memory apparatus according to claim 1, further comprising third writing means as part of said control circuit, wherein, in case of a continuous data write subsequent to the data write performed by said first writing means to said new cache block, said control circuit causes said third writing means to write the additional data immediately in excess of written sectors within said cache block.

3. The memory apparatus according to claim 2, further comprising fourth writing means as part of said control circuit, wherein, following the data write by said first writing means to said new cache block, if it is found impossible to write data immediately in excess of said written sectors within said new cache block, then said control circuit causes said fourth writing means to copy the data from said user data block up to a write starting sector address, before writing the additional data to said cache block.

4. The memory apparatus according to claim 3, further comprising fifth writing means as part of said control circuit, wherein, if said new cache block is found fully written upon data write by said fourth writing means, then said control circuit causes said fifth writing means to write the data from said new cache block back to said user data block without starting garbage collection as a copy operation preparatory to executing the write-back.

5. The memory apparatus according to claim 1, wherein said new cache block is an AD-cache type cache block used to hold file data.

6. The memory apparatus according to claim 1, wherein said determination means determines whether the data write from the host apparatus to the user data block of said user data is in excess of the designated logical boundary in response to receiving a write command from the host apparatus.

7. A memory apparatus comprising:
    a nonvolatile memory configured to have data written thereto and read therefrom in units of clusters and to have data deleted therefrom in units of blocks each formed by a plurality of sectors; and
    a control circuit configured to control said nonvolatile memory in operation;
    said nonvolatile memory including:
        (a) a management area in which to record management information
        (b) a user data area in which to record data coming from a user said user data area including logical blocks, said logical blocks having first addresses, wherein first physical blocks are assigned to said first addresses, said first physical blocks having second addresses; and
        (c) a cache area in which to hold temporarily the data to be written to and read from said user data area, said cache area including second physical blocks, said second physical blocks having third addresses arranged in ascending order based on utilization;
    said management area including:
        (a) a logical to physical conversion table retaining relations of correspondence between:
            (i) said first addresses of said logical blocks in said user data area; and
            (ii) said second addresses of said first physical blocks assigned to said first addresses of said logical blocks in said user data; and
        (b) said third addresses of said second physical blocks in said cache area corresponding to the second addresses of said first physical blocks assigned to said first addresses of said logical blocks; and
    said control circuit including:
        (a) determination means for determining whether a data write from a host apparatus to a user data block of said user data area is short of a designated logical boundary which defines a logical space size in units of a plurality of sectors within the user data block of said user data area;

(b) sixth writing means for writing, to a deleted new cache block in said cache area, data from the host apparatus determined to be short of the designated logical boundary; and (c) seventh writing means for having data written starting from the beginning of said new cache block upon data write by said sixth writing means to said new cache block, regardless of the logical address space of said new cache block.

8. The memory apparatus according to claim 7, further comprising eighth writing means as part of said control circuit, wherein, in case of a data write to the same logical address space within said new cache block following the data write by said sixth writing means to said new cache block, said control circuit causes said eighth writing means to write the additional data immediately in excess of written sectors within said cache block.

9. The memory apparatus according to claim 8, further comprising ninth writing means as part of said control circuit, wherein, following the data write by said eighth writing means to said new cache block, if the written data is found short of said designated logical boundary, then said control circuit causes said ninth writing means to copy the data from said user data block up to the sector address of said designated logical boundary.

10. The memory apparatus according to claim 9, further comprising tenth writing means as part of said control circuit, wherein, if said new cache block is found fully written upon data write by said ninth writing means, then said control circuit causes said tenth writing means to write the data to another cache block.

11. The memory apparatus according to claim 10, further comprising eleventh writing means as part of said control circuit, wherein, in case of a data write in excess of said designated logical border following the data write by said tenth writing means to said new cache block, said control circuit causes said eleventh writing means to write the data to another cache block.

12. The memory apparatus according to claim 7, wherein said new cache block is an OD-cache type cache block used to retain at least one of FAT-bound management information and directory entries.

13. The memory apparatus according to claim 7, wherein said determination means determines whether the data write from the host apparatus to the user data block of said user data is in excess of the designated logical boundary in response to receiving a write command from the host apparatus.

14. A memory apparatus comprising:
a nonvolatile memory configured to have data written thereto and read therefrom in units of clusters and to have data deleted therefrom in units of blocks each formed by a plurality of sectors; and
a control circuit configured to control said nonvolatile memory in operation;
said nonvolatile memory including:
  (a) a management area in which to record management information;
  (b) a user data area in which to record data coming from a user, said user data area including logical blocks, said logical blocks having first addresses, wherein first physical blocks are assigned to said first addresses, said first physical blocks having second addresses; and
  (c) a cache area in which to hold temporarily the data to be written to and read from said user data area, said cache area including second physical blocks, said second physical blocks having third addresses arranged in ascending order based on utilization;
said management area including:
  (a) a logical to physical conversion table retaining relations of correspondence between:
    (i) said first addresses of said logical blocks in said user data area; and
    (ii) said second addresses of said first physical blocks assigned to said first addresses of said logical blocks in said user data area; and
  (b) said third addresses of said second physical blocks in said cache area corresponding to the second addresses of said first physical blocks assigned to said first addresses of said logical blocks; and
said control circuit including:
  (a) twelfth writing means for, if all cache blocks in said cache area are found used upon data write to user data blocks in said user data area, then writing the data from said cache blocks back to said user data blocks without starting garbage collection as a copy operation preparatory to executing the write-back; and
  (b) first preferential processing means for causing said twelfth writing means to execute said write-back to said cache blocks preferentially in ascending order of data update frequency of non-full cache blocks.

15. A memory apparatus comprising:
a nonvolatile memory configured to have data written thereto and read therefrom in units of clusters and to have data deleted therefrom in units of blocks each formed by a plurality of sectors; and
a control circuit configured to control said nonvolatile memory in operation;
said nonvolatile memory including:
  (a) a management area in which to record management information;
  (b) a user data area in which to record data coming from a user, said user data area including logical blocks, said logical blocks having first addresses, wherein first physical blocks are assigned to said first addresses, said first physical blocks having second addresses; and
  (c) a cache area in which to hold temporarily the data to be written to and read from said user data area, said cache area including second physical blocks, said second physical blocks having third addresses arranged in ascending order based on utilization;
said management area including:
  (a) a logical to physical conversion table retaining relations of correspondence between:
    (i) said first addresses of said logical blocks in said user data area; and
    (ii) said second addresses of said first physical blocks assigned to said first addresses of said logical blocks in said user data area; and
  (b) said third addresses of said second physical blocks in said cache area corresponding to the second addresses of said first physical blocks assigned to said first addresses of said logical blocks; and
said control circuit including:
  (a) thirteenth writing means for, if all cache blocks in said cache area are found used upon data write to user data blocks in said user data area, then writing the data from said cache blocks back to said user data blocks; and
  (b) second preferential processing means for causing said thirteenth writing means to execute said write-back to said cache blocks preferentially in order of full cache blocks before non-full cache blocks.

16. A memory control method for controlling a management area, a user data area, and a cache area in a nonvolatile memory configured to have data written thereto and read therefrom in units of clusters and to have data deleted therefrom in units of blocks each formed by a plurality of sectors, said user data area including logical blocks, said logical blocks having first addresses, wherein first physical blocks are assigned to said first addresses, said first physical blocks having second addresses, said cache area including second physical blocks, said second physical blocks having third addresses arranged in ascending order based on utilization, said memory control method comprising:
a storing step of storing:
(a) a logical to physical conversion table retaining relations of correspondence between:
(i) said first addresses of said logical blocks in said user data area; and
(ii) said second addresses of said first physical blocks assigned to said first addresses of said logical blocks in said user data area; and
(b) said third addresses of said second physical blocks in said cache area corresponding to the second addresses of said first physical blocks assigned to said first addresses of said logical blocks; and
a determining step for determining whether a data write from a host apparatus to a user data block of said user data area is in excess of a designated logical boundary which defines a logical space size in units of a plurality of sectors within the user data block of said user data area;
a first writing step of writing, to a deleted new cache block in said cache area, data from the host apparatus determined to be in excess of the designated logical boundary; and
a second writing step of writing the data starting from the beginning of said new cache block upon data write in said first writing step to said new cache block, regardless of the logical address space of said new cache block.

17. The memory control method according to claim 16, further comprising, in case of a continuous data write subsequent to the data write performed in said first writing step to said new cache block, a third writing step of writing the additional data immediately in excess of written sectors within said cache block.

18. The memory control method according to claim 17, further comprising, subsequent to the data write in said first writing step to said new cache block, if it is found impossible to write data immediately in excess of said written sectors within said new cache block, a fourth writing step of performing a write to copy the data from said user data block up to a write starting sector address, before writing the additional data to said cache block.

19. The memory control method according to claim 18, further comprising, if said new cache block is found fully written upon data write in said fourth writing step, a fifth writing step of writing the data from said new cache block back to said user data block without starting garbage collection as a copy operation preparatory to executing the write-back.

20. A memory control method for controlling a management area, a user data area, and a cache area in a nonvolatile memory configured to have data written thereto and read therefrom in units of clusters and to have data deleted therefrom in units of blocks each formed by a plurality of sectors, said user data area including logical blocks, said logical blocks having first addresses, wherein first physical blocks are assigned to said first addresses, said first physical blocks having second addresses, said cache area including second physical blocks, said second physical blocks having third addresses arranged in ascending order based on utilization, said memory control method comprising:
a storing step of storing:
(a) a logical to physical conversion table retaining relations of correspondence between:
(i) said first addresses of said logical blocks in said user data area; and
(ii) said second addresses of said first physical blocks assigned to said first addresses of said logical blocks in said user data area; and
(b) said third addresses of said second physical blocks in said cache area corresponding to the second addresses of said first physical blocks assigned to said first addresses of said logical blocks; and
a determining step for determining whether a data write from a host apparatus to a user data block of said user data area is short of a designated logical boundary which defines a logical space size in units of a plurality of sectors within the user data block of said user data area;
a sixth writing step of writing, to a deleted new cache block in said cache area, data from the host apparatus determined to be short of the designated logical boundary; and
a seventh writing step of writing the data starting from the beginning of said new cache block upon data write in said sixth writing step to said new cache block, regardless of the logical address space of said new cache block.

21. The memory control method according to claim 20, further comprising, in case of a data write to the same logical address space within said new cache block following the data write in said sixth writing step to said new cache block, a eighth writing step of writing the additional data immediately in excess of written sectors within said cache block.

22. The memory control method according to claim 21, further comprising, following the data write in said eighth writing step to said new cache block, if the written data is found short of said designated logical boundary, a ninth writing step of performing a write to copy the data from said user data block up to the sector address of said designated logical boundary.

23. The memory control method according to claim 22, further comprising, if said new cache block is found fully written upon data write in said ninth writing step, a tenth writing step of writing the data to another cache block.

24. The memory control method according to claim 23, further comprising, in case of a data write in excess of said designated logical border following the data write in said tenth writing step to said new cache block, a eleventh writing step of writing the data to another cache block.

25. A memory control method for controlling a management area, a user data area, and a cache area in a nonvolatile memory configured to have data written thereto and read therefrom in units of clusters and to have data deleted therefrom in units of blocks each formed by a plurality of sectors, said user data area including logical blocks, said logical blocks having first addresses, wherein first physical blocks are assigned to said first addresses, said first physical blocks having second addresses, said cache area including second physical blocks, said second physical blocks having third addresses arranged in ascending order based on utilization, said memory control method comprising:
a storing step of storing:

(a) a logical to physical conversion table retaining relations of correspondence between:
  (i) said first addresses of said logical blocks in said user data area; and
  (ii) said second addresses of said first physical blocks assigned to said first addresses of said logical blocks in said user data area; and
(b) said third addresses of said second physical blocks in said cache area corresponding to the second addresses of said first physical blocks assigned to said first addresses of said logical blocks; and a twelfth writing step of, if all cache blocks in said cache area are found used upon data write to user data blocks in said user data area, then writing the data from said cache blocks back to said user data blocks without starting garbage collection as a copy operation preparatory to executing the write-back; and a first preferential processing step of causing said twelfth writing step to execute said write-back to said cache blocks preferentially in ascending order of data update frequency of non-full cache blocks.

26. A memory control method for controlling a management area, a user data area, and a cache area in a nonvolatile memory configured to have data written thereto and read therefrom in units of clusters and to have data deleted therefrom in units of blocks each formed by a plurality of sectors, said user data area including logical blocks, said logical blocks having first addresses, wherein first physical blocks are assigned to said first addresses, said first physical blocks having second addresses, said cache area including second physical blocks, said second physical blocks having third addresses arranged in ascending order based on utilization, said memory control method comprising:

a storing step of storing:
  (a) a logical to physical conversion table retaining relations of correspondence between:
    (i) said first addresses of said logical blocks in said user data area; and
    (ii) said second addresses of said first physical blocks assigned to said first addresses of said logical blocks in said user data area; and
  (b) said third addresses of said second physical blocks in said cache area corresponding to the second addresses of said first physical blocks assigned to said first addresses of said logical blocks; and a thirteenth writing step of, if all cache blocks in said cache area are found used upon data write to user data blocks in said user data area, then writing the data from said cache blocks back to said user data blocks; and a second preferential processing step of causing said thirteenth writing step to execute said write-back to said cache blocks preferentially in order of full cache blocks before non-full cache blocks.

* * * * *